US006314415B1

(12) United States Patent
Mukherjee

(10) Patent No.: US 6,314,415 B1
(45) Date of Patent: Nov. 6, 2001

(54) AUTOMATED FORMS PUBLISHING SYSTEM AND METHOD USING A RULE-BASED EXPERT SYSTEM TO DYNAMICALLY GENERATE A GRAPHICAL USER INTERFACE

(75) Inventor: Krishna C. Mukherjee, Flushing, NY (US)

(73) Assignee: CCH Incorporated, Riverwoods, IL (US)

( * ) Notice: Subject to any disclaimer, the term of this patent is extended or adjusted under 35 U.S.C. 154(b) by 0 days.

(21) Appl. No.: 09/185,581

(22) Filed: Nov. 4, 1998

(51) Int. Cl.[7] ..................................................... G06F 17/00
(52) U.S. Cl. ................................ 706/47; 706/45; 706/46
(58) Field of Search .................................. 706/50, 45, 46, 706/47, 49

(56) References Cited

U.S. PATENT DOCUMENTS

| | | | |
|---|---|---|---|
| 4,558,413 | * 12/1985 | Schmidt et al. | 707/203 |
| 5,181,162 | * 1/1993 | Smith et al. | 707/530 |
| 5,193,185 | * 3/1993 | Lanter | 707/101 |
| 5,630,025 | * 5/1997 | Dolby et al. | 706/46 |
| 5,696,885 | * 12/1997 | Hekmatpour | 706/59 |
| 5,712,960 | * 1/1998 | Chiopris et al. | 706/61 |
| 5,720,007 | * 2/1998 | Hekmatpour | 706/50 |
| 5,806,056 | * 9/1998 | Hekmatpour | 706/50 |
| 5,822,745 | * 10/1998 | Hekmatpour | 706/59 |
| 5,835,683 | * 11/1998 | Corella et al. | 706/59 |
| 5,870,768 | * 2/1999 | Hekmatpour | 707/501 |
| 6,081,786 | * 6/2000 | Barry et al. | 705/3 |
| 6,185,733 | * 2/2001 | Breslau et al. | 717/5 |

OTHER PUBLICATIONS

Hermens: "A Machine–Learning Apprentice For The Completion of Repetitive Forms", proceedings of the Conference On Artificial Intelligence For Application, IEEE Comp, vol. con. 9, 1993, pp. 164–170.

Collet: "Definition Et Manipulation De Formulaires Avec Fo2(1)", Technique Et Science, Paris, vol. 10, No. 1, Jan. 1, 1991, pp. 97–124.

Mukherjee, K.C., *"Temporal Logic Programming System"*, A thesis submitted in partial fulfillment of the requirements for the degree of Master of Technology, Kampur, Feb. 1988.

Han et al, "Logic Base: A deductive database system prototype", ACM CIKM pp 226–233, Mar. 1994.*

Ceri et al, "Normalization of relations and Prolog", Comm. of the ACM, vol. 29, No. 6, pp 524–544, Jun. 1986.*

Debenham, "Normalization Knowledge Objects", ACM CIKM, pp 335–343, Mar. 1993.*

Frank et al, "Adaptive Forms: An interaction Paradigm for Entering Structured Data", ACM IUI, pp 153–160, Jun. 1998.*

Microsoft Press, "Getting Results with Microsoft Office 97", 109, 239–57, 358–59, 499, 504, 520, 542, 1996.*

* cited by examiner

*Primary Examiner*—Kakali Chaki
*Assistant Examiner*—Anil Khatri
(74) *Attorney, Agent, or Firm*—Banner & Witcoff, Ltd.

(57) ABSTRACT

A system and method includes a rule-based expert system that uses high-level rules for determining what graphical interface features should be displayed to a user. The rules can be written in a language such as PROLOG and used in an inference engine to drive the graphical user interface. The rules can be changed without recoding and testing of computer software, and without specialized computer software knowledge. Consequently, people other than programmers can customize and change a graphical user interface easily and without errors. Certain embodiments include a scanner and related software that captures data fields from existing paper forms; a database for storing field definitions and their relationships together with rules for determining which user interface features to display at a particular point in a data entry sequence; an inference engine for executing the rules; a graphical user interface component that provides the user with dynamically generated screen configurations based on execution of the rules (which are fired based on inferences drawn from data the user has entered); and a printing component that generates paper and/or electronic forms based on the user's inputs and the execution of the rules. Other embodiments include a method for using a graphical user interface to dynamically represent information based on previous responses including steps of displaying a first set of information for which data selection is required; using the first set of information to fire rules in an inference engine, wherein the rules produce conclusions that are used to dynamically generate a second set of information for which data selection is required; storing the results of the first and second sets of information as predicates for further rules; and generating one or more forms using the first and second sets of information.

22 Claims, 17 Drawing Sheets

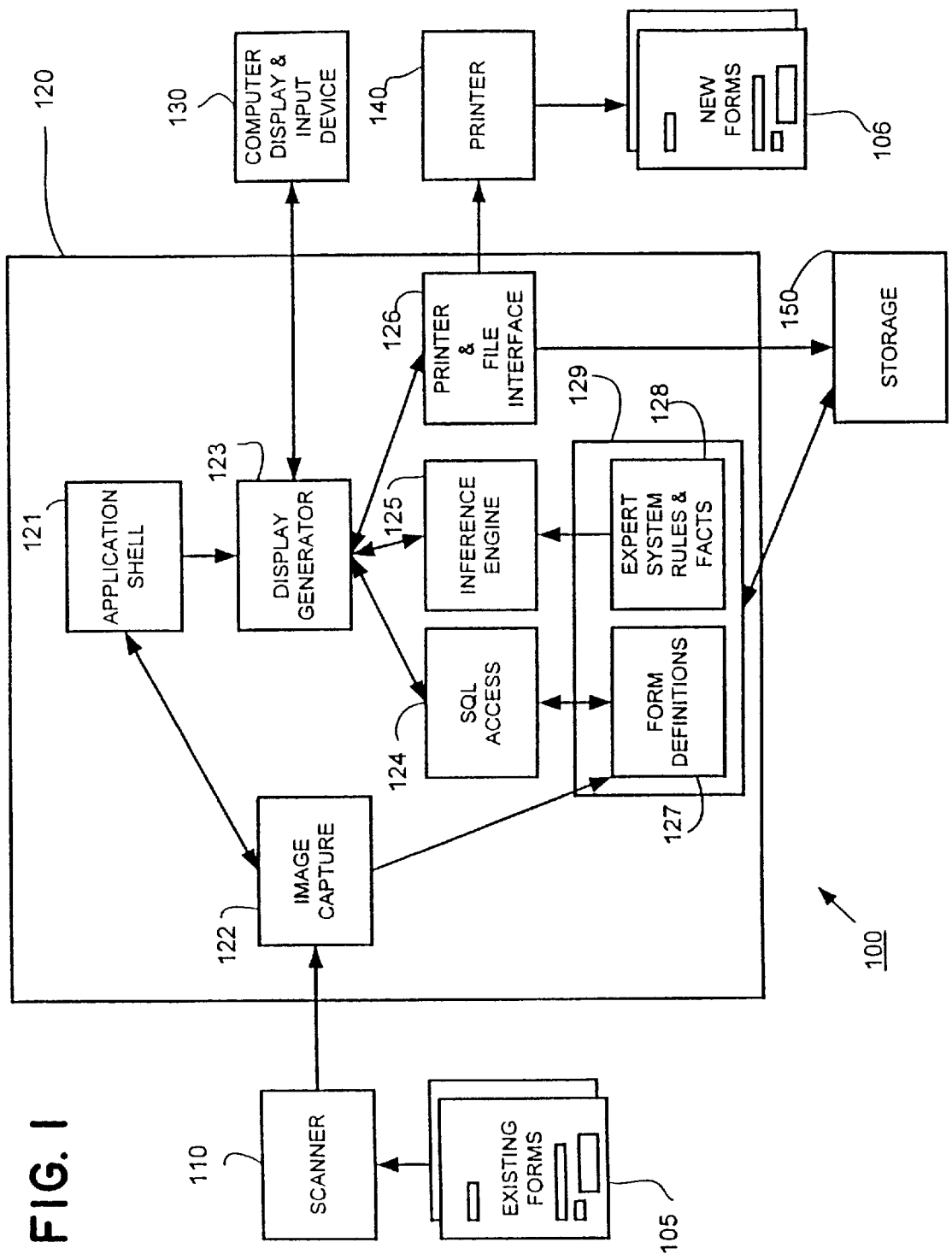

CT Insurance Advantage - [Filing Manager-FilingSession1]
File Edit View Services Admin Window Help Services
Filing Manager 1. *What is the purpose of this application?(check all that apply)*
☐ Qualifying Active Officer or Partner ?  ☐ Existing Agent Requesting Additional Lines
☐ New Agent License     ☐ Previous Agent License ? — 305

2. *What is the applicant's name?*
First Name
Middle Name
Middle Initial
Last Name
— 306

3. *Is a name change being submitted?*
○ Yes
○ No
First Name
Last Name
○ Junior
○ Senior
— 307

<<Previous  Next>>

Question Count:
Ready...

CT Insurance Advantage - [Filing Manager-FilingSession1]

File Edit View Services Admin Window Help

Services / Filing Manager

1. Please provide the following details about each person being appointed or terminated: — 308

| | First Name | Middle Initial | Last Name | Suffix | Tax ID Number (SSN or FEIN) | Please |
|---|---|---|---|---|---|---|
| 1 | | | | | | ? |
| 2 | | | | | | |

2. Enter the 5 digit NAIC number of the Insurer. [?] — 309

3. Enter the insurer's company code in the following state(s): — 310
Pennsylvania 4. What is the name of a contact person at the insurer? — 311

<<Previous  Next>>

Question Count:
Total # of Questions:9 Total # of Questions Answered: 0 Total # of Questions Remaining: 9

Ready...

CT Insurance Advantage - [Filing Manager-Filing Manager 8]
File Edit View Services Admin Window Help Services
Filing Manager 5. What is the applicant's date of birth? 10/27/1998

6. Is the applicant a resident of the following state(s) — 312
   South Carolina ○ No ○ Yes — 313

7. Does the applicant currently hold any of the following licenses in their resident state?
   ☐ Broker ☐ Agent 8. Select the line(s) of authority for which the applicant has/is applying for authority — 314
   ☐ Accident and Health          ☐ Crop Hail                  
   ☐ Industrial Fire              ☐ Industrial Life
   ☐ Life                         ☐ Marine
   ☐ Property                     ☐ Surety
   ☐ Title                        ☐ Travel Accident and Baggage
   ☐ Variable Annuities           ☐ Mortgage Guaranty
   ☐ Automobile Physical Damage   ☐ Auto Liability
   ☐ Industrial Accident and Health ☐ Credit Property
   ☐ Variable Annuity Associated Person ☐ Casualty
   ☐ Credit Accident and Health   ☐ Credit Life <<Previous    Next>>

Ready...

FIG. 3L

*13. School Information.*
How many years did the applicant attend this school?:

| | Please enter the years at | Did the applicant graduate? | What degree did the app... |
|---|---|---|---|
| 1 | 11/27/1998 | ○ Yes ◉ No | BS |
| 2 | 09/27/1998 | ◉ Yes ○ No | MS |
| 3 | 11/27/1998 | ○ Yes ◉ No | BS |

315
316
317

*14.* Has the applicant ever been convicted of any criminal offense involving fraud, deceit or misrepresentation?
○ Yes ○ No

*15.* Has the applicant ever been found liable for any criminal penalty or civil damages in any legal or administrative proceedings brought upon such grounds?
○ Yes ○ No

*16.* If yes, please provide the following details: Name of Government Agency, national securities exchange, or nation securities association; name of the insurance company which sponsored or licensed the applicant; capacity in which the applicant as licensed: name and location of broker or dealer with which the applicant

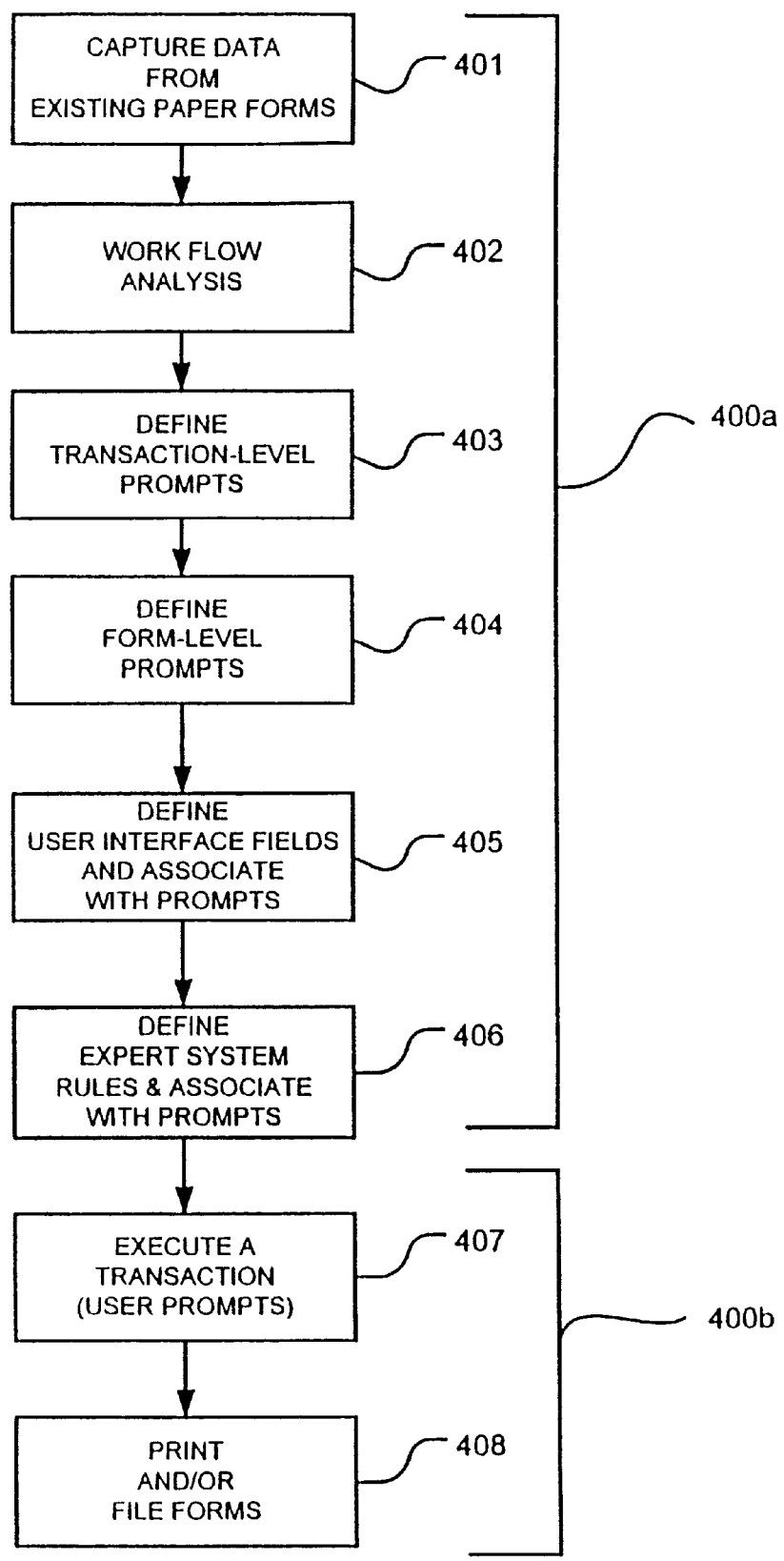

AUTOMATED FORMS PUBLISHING SYSTEM AND METHOD USING A RULE-BASED EXPERT SYSTEM TO DYNAMICALLY GENERATE A GRAPHICAL USER INTERFACE

BACKGROUND OF THE INVENTION

1. Technical Field

This invention relates generally to systems that produce computer-generated forms, such as standardized documents that must be filed with government agencies, legal documents, employment-related documents, and the like. More particularly, the invention provides an expert system-based approach for prompting users for information and generating forms that avoids the need for hardcoded graphical user interface (GUI) software.

2. Related Information

Companies today endure an enormous paperwork burden, much of it in the form of standardized documents that must be submitted to government agencies or shared with other entities such as credit bureaus. As one example, insurance companies seeking to have their insurance agents licensed in several states must fill out different application forms for each state, wherein the different forms often require supplying redundant and irrelevant information. As another example, an employment action such as hiring a new employee may require filling out information on separate forms for health insurance, retirement plans, tax filings, and state and federal administrative filings. As yet another example, food manufacturers that package food in containers must report how they sterilize food and file documents with the Food and Drug Administration, wherein a separate form is required for every combination of product, style, and package type.

The multiple forms that must be completed for the various transactions of often contain redundant and irrelevant information. For example, a basic employment application may require supplying an employee's name, date of birth, social security number, and marital status. A separate health insurance form may also require this same information, plus the name of a preferred doctor, a spouse's name, and a spouse's social security number. Requiring that an employee specify his or her name on the separate forms is duplicative. Moreover, if an employee's marital status was indicated on the employment application as being "single," entering a spouse's name and social security number on the health insurance form is irrelevant and unnecessary. In other words, certain information on the various forms may be irrelevant or already known based on an earlier entry supplied by a user entering data.

One approach for solving some of the aforementioned problems is to write customized computer software that presents a user with a computerized version of each paper form, thus facilitating data entry. The user interface could be tailored to resemble the paper form, or it could be different but still generate a paper facsimile of the original paper form with the user-supplied information printed thereon. In an employment setting, for example, an employee could enter data on separate computer-generated screens and have the computer generate a populated employment application, a health benefits form, and income tax witholding form.

There are several problems with the foregoing "brute force" computerized approach to forms processing. First, redundant and overlapping information from different forms will not necessarily be eliminated. For example, requiring the employee to re-enter his or her name, once for each different form, is unnecessary. Second, irrelevant information is still presented to the user. For example, if an employee enters his marital status as "single," the user may still be presented with an entry space for entering "spouse name." Finally, the software (typically written in C, COBOL, or other high-level language) must be customized, coded, and retested any time there is a change to a form. This recoding and retesting incurs high labor costs and requires that companies adopt proprietary systems that can quickly become obsolete or vulnerable to a software vendor who goes out of business. Even so-called "context-sensitive" user interface techniques, assuming they could be applied to forms processing applications, would not address the foregoing problems. For these and other reasons, reliance on custom software to handle data entry for prompting users for information and for printing the forms is undesirable.

SUMMARY OF THE INVENTION

The present invention overcomes the aforementioned problems by providing features that facilitate data entry, avoid redundant and unnecessary information from graphical user interfaces, and permit changes to the user interfaces (and resulting forms) without relying on "hardcoded" software. In various embodiments, the inventive system includes a rule-based expert system and method that uses high-level rules for determining what graphical interface features should be displayed to a user at a particular point in the process. These rules can be written in a natural language or a high-level language such as PROLOG and used in an inference engine to drive the graphical user interface. The rules can be changed easily without recoding and testing of computer software, and without specialized computer software knowledge. Consequently, people other than programmers can customize and change a graphical user interface easily and without errors. Additionally, the use of a logic-based expert system approach permits searching for solutions in a decision tree and supports self-modification during execution.

Certain embodiments of the present invention include a scanner and related software that captures data fields from existing paper forms; a database for storing field definitions and their relationships together with rules for determining which user interface features to display at a particular point in a data entry sequence; an inference engine for executing the rules; a graphical user interface component that provides the user with dynamically generated screen configurations based on execution of the rules (which are fired based on inferences drawn from data the user has entered); and a printing component that generates paper and/or electronic forms based on the user's inputs and the execution of the rules. Other embodiments of the invention include a method for using a graphical user interface to dynamically represent information based on previous responses including steps of displaying a first set of information for which data selection is required; using the first set of information to fire rules in an inference engine, wherein the rules produce conclusions that are used to dynamically generate a second set of information for which data selection is required; storing the results of the first and second sets of information as facts that may satisfy predicates of other rules; and generating one or more forms using the first and second sets of information.

Additional features provided in certain embodiments include the ability to display a transaction-level user screen including a first plurality of user prompts arranged according to an assigned priority level and dynamically generated based on user inputs, and one or more form-level user screens each including a second plurality of user prompts arranged in priority order and dynamically generated based on information supplied on the transaction-level screen.

Other features and advantages of the invention will become apparent with reference to the following detailed description and the figures.

BRIEF DESCRIPTION OF THE DRAWINGS

FIG. 1 shows a stand-alone system illustrating various principles of the present invention.

FIG. 3C shows the screen of FIG. 3A after a user has selected nonresident status and a jurisdiction that permits multiple producers, thus enabling the "number of producers" prompt 304.

FIG. 3E shows a second-level GUI screen for an insurance/license appointment filing application that includes a partially disabled name change prompt 307.

FIG. 3F shows the screen of FIG. 3E after a user has indicated that a name change is being submitted, thus fully enabling the name change prompts 307.

FIG. 3G shows the screen of FIG. 3A after a user has selected an appointment filing type (thus disabling certain choices in prompt box 301), a residency status, a multi-producer jurisdiction, and a number of producers.

FIG. 3H shows a screen resulting from the selections made in FIG. 3G, such that two row entries are generated in prompt box 308, corresponding to the number of producers selected in FIG. 3G.

FIG. 3I shows the screen of FIG. 3A after a user has specified 5 producers in prompt area 304.

FIG. 3J shows a screen resulting from the selections made in FIG. 3I, such that five row entries are generated in prompt box 308, corresponding to the number of producers selected in FIG. 3I.

FIG. 3K shows a screen containing a group of radio groups 312.

FIG. 3L shows a screen containing a "spin-grid-group" consisting of a spin control 315 and a grid 316 having a number of rows determined by the current spin value, and wherein one column of the grid includes a radio group 317 in each cell.

FIG. 4 shows a method according to one aspect of the present invention, including steps for defining prompts, defining expert system rules and associating them with the prompts, and for executing a transaction based on the expert system rules.

DETAILED DESCRIPTION OF THE PREFERRED EMBODIMENTS

Figure 2A:
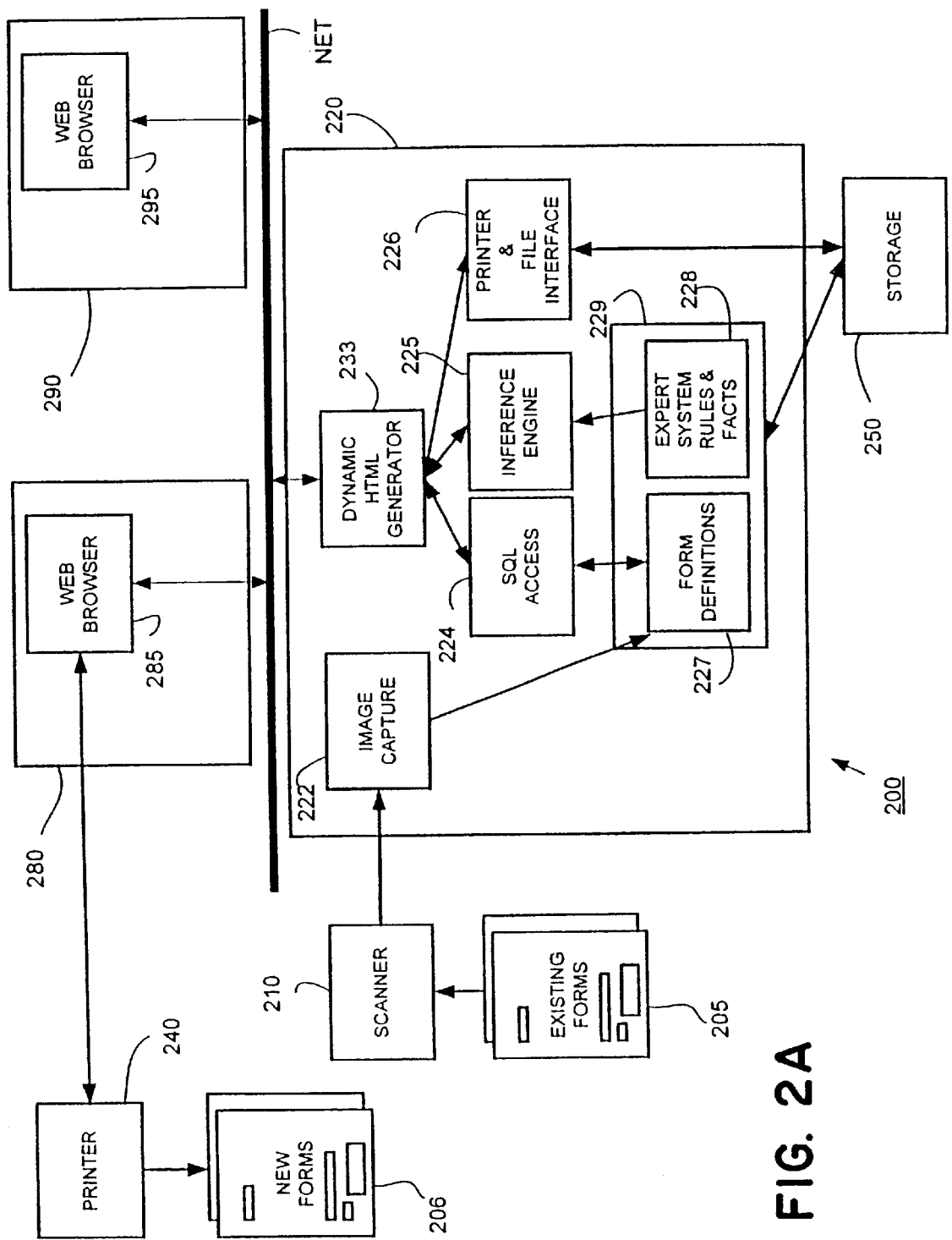
FIG. 2A shows a distributed system including web browsers that can be used to carry out various principles of the present invention.

FIG. 1 shows a system 100 employing various principles of the present invention. A computer 120 is coupled to a scanner 110, a computer display unit 130 including an input device (mouse, keyboard, etc.), a printer 140, and a storage unit 150. The computer may comprise any of various well known platforms such as an Intel-based Windows-compatible PC. In addition to the operating system, several software components are shown residing on computer 120. These include image capture package 122, application shell 121, display generator 123, SQL access component 124, inference engine 125, printer and file interface 126, and database 129 including a forms definition component 127 and expert system rules 128. The allocation of software functions to the illustrated components, as well as the hardware, is of course exemplary and not intended to be limiting. Moreover, some of the components and interfaces in FIG. 1 are shown in simplified form for the purpose of explanation and are described in more detail herein. It will also be understood that functions illustrated as being performed by software can instead be performed by hardware, and vice versa.

As explained in more detail herein, a method employing the present invention may be conveniently partitioned into a "content creation" phase and an "execution" phase. The content creation phase includes steps of data modeling, the formatting and layout of forms to be used in the system, and the creation of the expert system rules to generate graphical user interface displays. This phase typically will be done once to set up the system for a particular application. The execution phase includes steps of entering data in response to prompts from the graphical user interface, and generating populated forms in printed or electronic form, followed optionally by a step of filing the forms with a government agency or corporate entity. This phase will typically be performed repeatedly, once for each transaction (e.g., each time a new employee is hired, or each time a new insurance agent is appointed).

In one variation of the content creation phase, a plurality of existing paper forms 105 is fed into scanner 110 and the data thereon (e.g., fields, descriptions and arrangement on the paper forms) is captured by image capture software 122. Scanner 110 may comprise any of various commercially available scanners, and image capture software 122 may comprise any one of several commercial software packages such as Adobe Exchange. The image capture software may be launched from an application shell 121 written in a computer language such as C++. Form definition information can of course also be created using commercially available software, rather than by scanning existing forms.

Form definition information captured by image capture 122 or by other means is stored in database 129 for further processing. Database 129 may comprise a commercially available database such as Oracle or Microsoft Access. It will be appreciated that both the data and the software comprising the database may reside on either or both storage device 150 and the memory of computer 120. Moreover, SQL access component 124 may not be needed if a non-SQL compatible database is used. In that case, a suitable interface to the database would be selected.

A set of expert system rules 128 also resides in database 129. According to one variation of the present invention, these rules are written in a high level logic-based language such as PROLOG, a fifth-generation language (5GL) frequently used in artificial intelligence applications. The rules can alternatively be written in a natural language that allows business rules to be specified in ordinary English. The nature of the rules and their use in the system will be explained in more detail later. The rules are used to drive inference engine 125, which may comprise a commercially available product such as LPA Prolog for Windows or Amzil Prolog 4.0. The knowledge base rules can be compiled into a binary form to execute at run time. At run time, display generator 123 asserts or retracts facts based on user responses, and queries the database before displaying a next set of prompts on computer display 130.

Printer and file interface component 126 allows forms to be printed to printer 140 and forms data to be stored on storage device 150. Adobe's Application Program Interface may be used to support previewing and printing of forms. The popular PDF (Portable Document Format) standard may be used for high-quality screen previewing and printing.

SQL access component 124 provides a Structured Query Language standardized interface to database 129. In one embodiment, components 124, 125 and 126 are Microsoft Component Object Model (COM) compatible components in order to facilitate insertion into various systems and configurations.

Display generator 123 operates under the control of application-specific shell 121, and may be implemented in C++, Visual Basic, JAVA, or another high level language. However, it is preferably application-independent, such that changes to the user interface can be made by changing form definitions 127 and expert system rules 128. In summary, display generator 123 generates graphical user interface components on computer display 130 in response to form definitions retrieved through SQL access component 124 and the firing of expert system rules executed by inference engine 125, which are in turn driven by user inputs received through computer display 130. As a user enters information through computer display 130, various rules in the database will be "fired," thus changing the appearance of the display for future prompts. The dynamically changing nature of the graphical user interface avoids prompting the user for redundant or irrelevant information.

As one example, if a user were to select a choice on display 130 indicating that his marital status is "single," one rule could be fired to assert a condition that the person is single, and another rule could be fired (based on that assertion) removing any fields from display 130 relating to spouses. As another example, if a user were to indicate in response to a query that she has three children, a rule could fire that generates three separate blocks of data fields on display 130, one for each child (i.e., name, social security number and date of birth for each child).

Figure 3A:
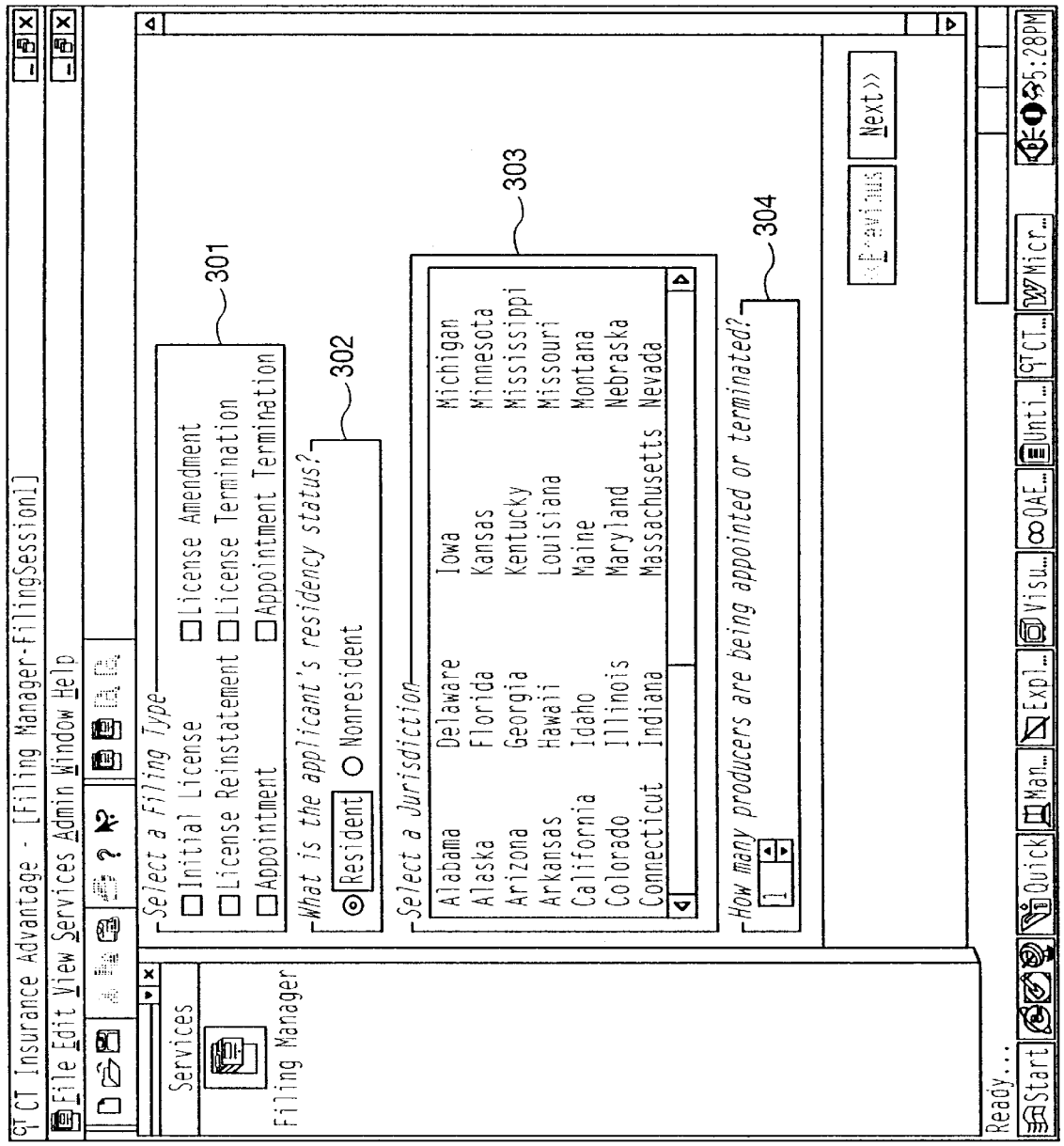
FIG. 3A shows a first-level graphical user interface (GUI) screen for an insurance license/appointment filing application with a "number of producers" prompt 304 disabled.

Display generator 123 can generate screens such as those shown in FIGS. 3A trough 3L using well known Windows display techniques (e.g., check boxes, "radio dial" type user controls, scroll bars, and the like). Special GUI controls are described herein to support certain types of forms. alternatively, display generator 123 can be implemented to generate HTML output, thus allowing a browser to be used for the user interface, either on computer 120 or on a remote computer accessed over the Internet or other network. However, in contrast to conventional approaches, the screens are generated dynamically based on the firing of expert system rules rather than hardcoded conditional logic that would otherwise need to be modified, recompiled and retested by programmers in order to modify the display sequence or content.

After a user has entered information in response to the dynamically changing prompts, new forms can be printed using printer 140, or forms could be electronically generated and stored for electronic filing. Based on form definition information in database 129, all the necessary forms (e.g., employment application forms, tax withholding forms, health benefit forms) can be generated that match a particular company's format requirements (and the government's format and content requirements) even though the user did not separately create data for each form. Thus, for example, information that is common across multiple forms need not be entered by a user more than once, even though it appears on different output forms at different locations and in potentially different formats.

The present invention differs from so-called "context sensitive" displays in several respects. In particular, the display sequence, content, error checking, and other features can be changed merely by changing the expert system rules, which are written in a very high level logic-based style (e.g., PROLOG or a natural language) that can be understood by non-programmers. Even Hyper Text Mark-up Language (HTML), sometimes considered to be a high-level language that does not require detailed programming knowledge, cannot provide these features. And, in contrast to conventional context-sensitive selection techniques (e.g., pull-down menus in Microsoft applications that enable or disable certain selections based on a previously selected choice), the rules can be changed without writing new "hardcoded" application-specific software. Indeed, complex combinations of rules can be created and executed in inference engine 125 to entirely change the display, without recoding, recompiling, and retesting application program code.

Figure 2B:
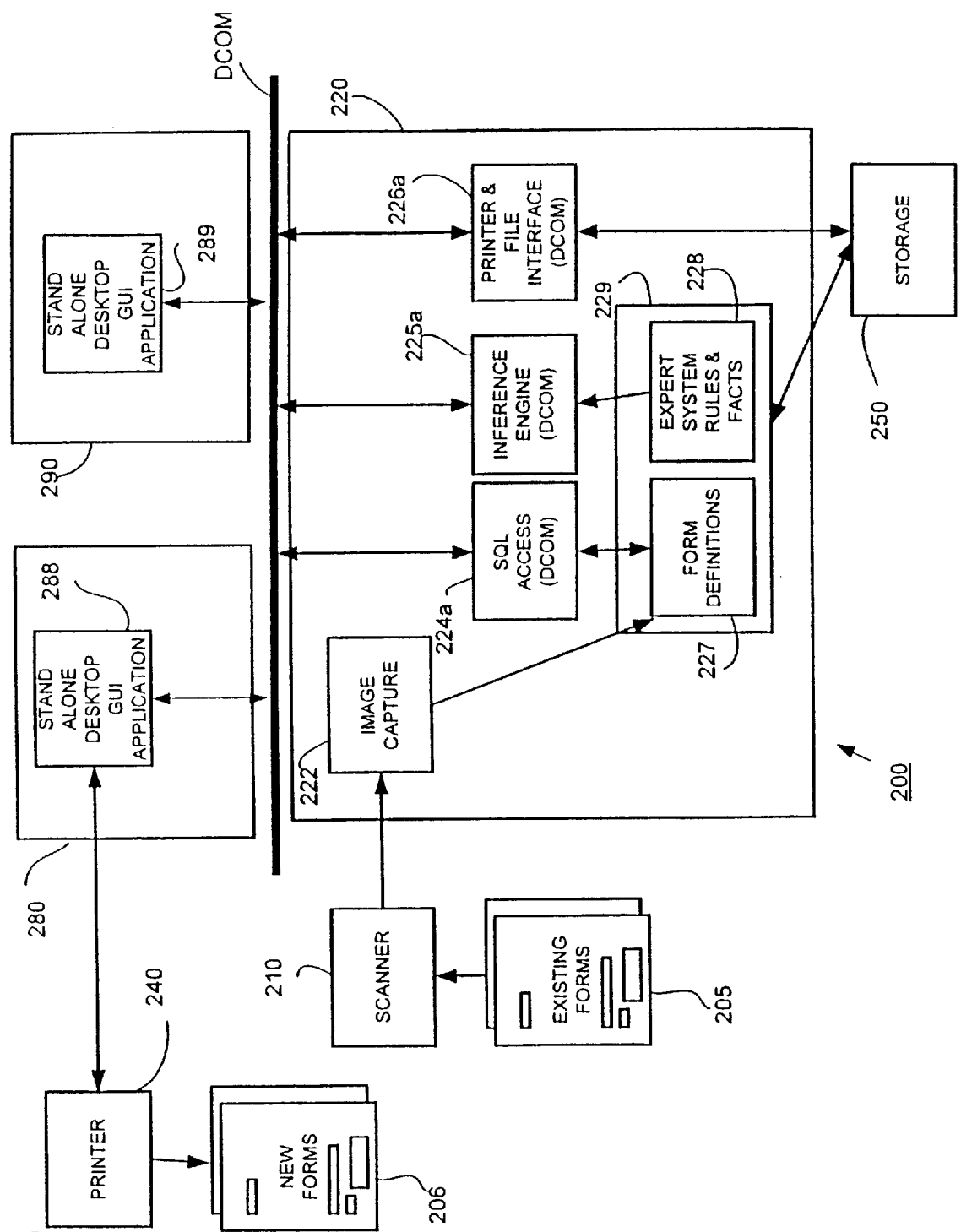
FIG. 2B shows a distributed system including stand-alone desktop applications that can be used to carry out various principles of the present invention.

FIGS. 2A and 2B show two versions of a client/server based distributed system 200 employing various features of the present invention. FIG. 2A shows a web browser-based version communicating over a network such as the Internet, while FIG. 2B shows a standalone desktop application version communicating via Distributed Component Object Model (DCOM) interfaces. It is assumed that in the systems shown in both FIG. 2A and FIG. 2B, the content creation steps are performed at the server computer (e.g., image capture and layout of forms) while the execution phase is carried out by individual users using software on their respective client computers, although the invention is of course not limited in this respect. Additionally, forms created by client computers can be stored at the server computer or at the client computers as appropriate. Responses to prompts on forms displayed at each client computer can also be transmitted to server computer 220 for storage and later retrieval.

Referring first to the embodiment of FIG. 2A, one or more client computers 280 and 290 are coupled to a server computer 220 through a network NET such as the Internet. Each client computer includes a suitable user interface (e.g., HTML-compliant web browsers 285 and 295) that displays web pages to a user and communicates with a dynamic HTML generator 233 executing in server computer 220 using the well known HTTP protocol. Dynamic HTML generator 233 replaces display generator 123 of FIG. 1 but performs similar functions to generate HTML that controls the displays of web browsers 295 and 295. As expert system rules are fired in inference engine 225 in response to user inputs at each client computer, dynamic HTML generator 233 modifies user displays at each client computer in accordance with changing conditions and assertions. Web pages (not explicitly shown) can be stored in database 229 for display at the client computers. A printing package such as Adobe Acrobat can be included with each web browser in the client computers to perform local printing of forms 206 at a printer 240 at the client computers. Server computer 220 can execute the Microsoft Internet Information Server package or other commercially available packages to support client computers 280 and 290. A separate session may be required for each client to maintain separate instances of the knowledge base 228 (e.g., facts asserted as to one user will not necessarily hold as to a different user who is simultaneously executing the application).

Referring now to the embodiment of FIG. 2B, DCOM-compatible versions of SQL access component 224a, inference engine 225a, and printer & file interface 226a are provided to communicate directly with stand alone desktop GUI applications 288 and 299, respectively. Consequently, the dynamic HTML generator 233 of FIG. 2A is not required in this embodiment. Stand alone desktop GUI applications 288 and 290 perform functions similar to those of web browsers 285 and 295, but use DCOM compatible interfaces to retrieve forms, execute rules and store populated forms. As with the embodiment of FIG. 2A, forms 206 can be printed locally at the client computers through a local printer 240.

Reference will now be made to FIGS. 3A through 3L which in conjunction with the following explanation show how certain features of the present invention can be practiced. In particular, these figures show how certain types of expert system rules can be used to control the appearance of the user's display and hence the types of prompts that the user will see as he or she enters information. It will be assumed for the examples shown that the "content creation" phase of the invention has been completed, such that a set of form definition information already exists, and a set of rules has been specified for generating the displays. Further details of the content creation phase will be described after the example is explained. The example application is for insurance license and appointment filings, and could be used by an insurance company that seeks to have an insurance agent appointed or licensed in multiple states.

FIG. 3A shows an introductory GUI screen or form presented to a user of the insurance filing application. For data entry purposes, a form may correspond to one or more screens, or part of a screen. It is generally intended, however, that a form will comprise one or more related prompts requiring input by a user from an input device. On the output side, forms may correspond to the paper forms that must be populated with information and filed with a government agency, for example. As a practical matter, the "forms" that a user sees on the computer display device need not resemble the paper forms generated as an output.

Although the examples are shown in accordance with well-known Windows operating system display techniques, it will be appreciated that the invention is not limited in this respect. Moreover, the examples are specific to the insurance filing application and thus their content, layout and sequencing are merely exemplary.

As shown in FIG. 3A, the screen includes first prompt area 301 that permits the user to specify one or more filing types (e.g., initial license, license reinstatement, etc.). A second prompt area 302 permits the user to specify whether the applicant is a resident or a nonresident; a third prompt area 303 allows the user to specify one or more jurisdictions; and a fourth prompt area 304 allows the user to specify the number of producers that are being appointed or terminated. It can be seen that prompt areas 301 and 302 are "box checking" type prompts; prompt area 303 is a "highlighting" type prompt with a scroll bar at the bottom, and prompt area 304 is a "spin control" type prompt that allows a user to increment or decrement a number. However, as shown in FIG. 3A, the number of producers prompt area 304 is not enabled (i.e., it appears as a shadowed area or equivalent thereof) and hence the user cannot adjust the number until information in prompt areas 301, 302 and 303 is specified.

Changing prompt area 304 from a disabled prompt (as shown in FIG. 3A) to an enabled condition can be implemented using an expert system rule stating that prompt area 304 (relating to the number of producers) is enabled if "appointment" is selected and Pennsylvania (which is a multi-producer state) is enabled. As described in more detail herein, the rule can be specified by a non-programmer lay person who needs only to understand how to specify high-level rules using a logic-based language such as PROLOG. Such a rule would test whether a multi-producer jurisdiction had been selected and, in response thereto, assert a condition that prompt area 304 should be enabled. Display generator 123 (FIG. 1) would then generate displayable prompt areas corresponding to rules that had been "fired" corresponding to the selected choices.

It is generally contemplated that as a user specifies and selects information on each screen in response to dynamically generated prompts, he or she can advance to a next screen (shown by a "next" button at the bottom of FIG. 3A) to continue with the data entry process. Expert system rules can be specified to prevent advancing to a next screen until certain minimum information has been specified on the previous screen. For example, an error prompt could be generated by a rule that fires if no filing type and residency status have been selected on the screen shown in FIG. 3A. Similarly, it is possible to disable the "next screen" button until such a rule is satisfied.

Figure 3B:
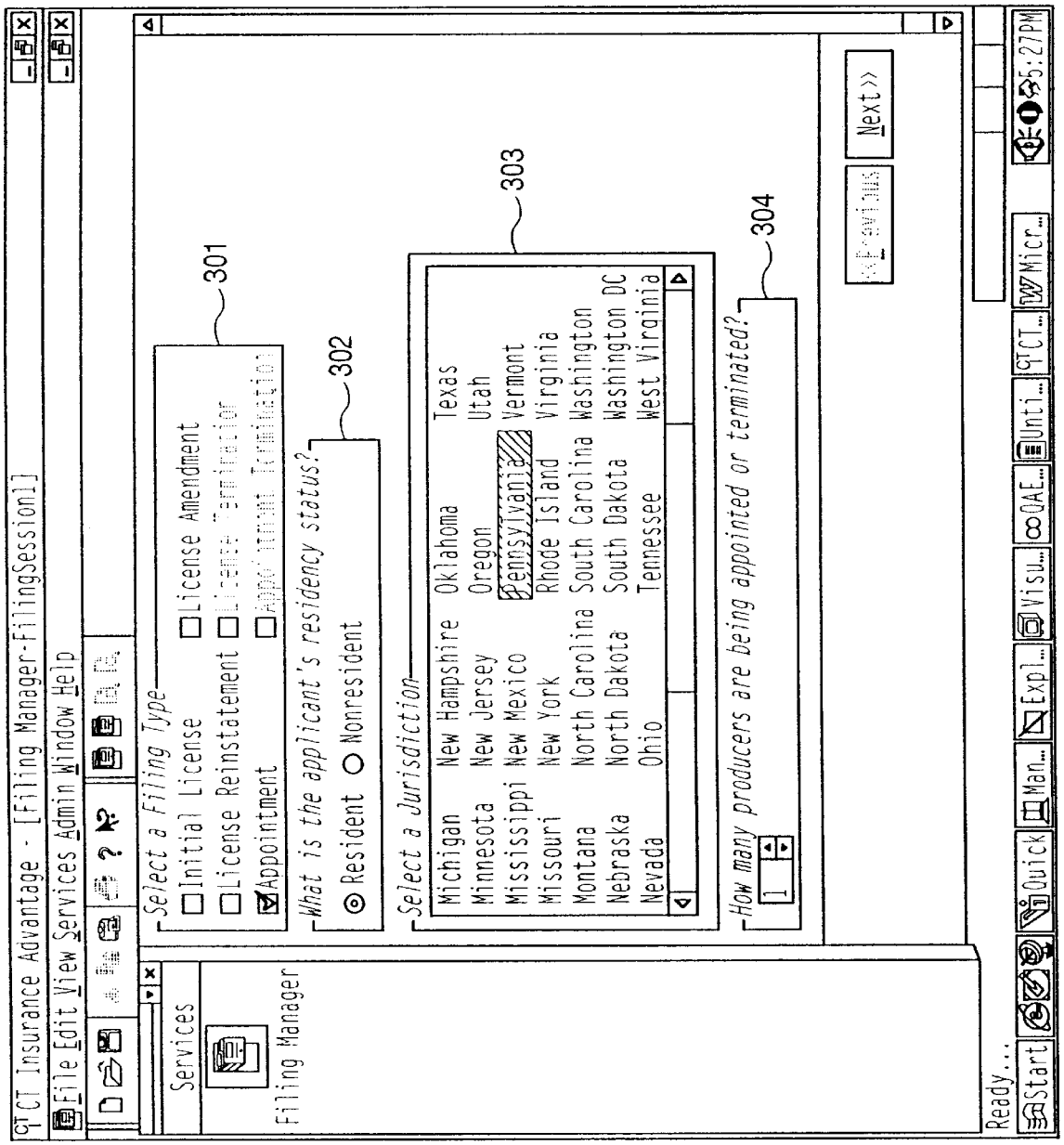
FIG. 3B shows the screen of FIG. 3A after a user has selected a filing type, residency status and a jurisdiction, thus enabling the "number of producers" prompt 304.

FIG. 3B shows the screen of FIG. 3A after a user has selected a filing type (appointment), residency status (resident) and a multi-producer jurisdiction (Pennsylvania), thus enabling the "number of producers" prompt 304 and storing a default value of 1 in the prompt. This illustrates a rule that Pennsylvania, which is a multi-producer state, allows multiple producers to be specified by the user. In response to the firing of this rule, display generator 123 has generated an "enabled" prompt area 304 that permits the user to increment or decrement the displayed number. If the user were to de-select Pennsylvania and select a state (such as Illinois) that does not permit multiple producers, the appropriate rules would "fire," thus disabling number of producers prompt 304.

In various embodiments, the rules stored in database 128 (FIG. 1) are executed every time a user makes a state change on the user interface, such that all of the various conditions are tested to ensure that only relevant and non-redundant information is displayed to the user. Every state change on the user interface causes the assertion of a fact (e.g., Pennsylvania has been selected), thus causing a "ripple" effect through the rules and potentially changing the appearance of the display. The dynamic changes to the display are generated in real-time based on the firing of the rules, rather than being based on "hardcoded" conditions created by a programmer. This permits the user interface to be changed easily and in a flexible manner.

Prompts that are always displayed regardless of user input (e.g., prompt areas 301, 302 and 303) can be implemented using expert system rules that always assert the conditions necessary to display the prompt unless deactivated by a later condition. As one example, selecting "appointment" in prompt area 301 can fire a rule that disables irrelevant or impossible combinations, such as appointment termination. In this manner, the user is not presented with irrelevant information and cannot select incompatible choices on the screen.

Figure 3C:
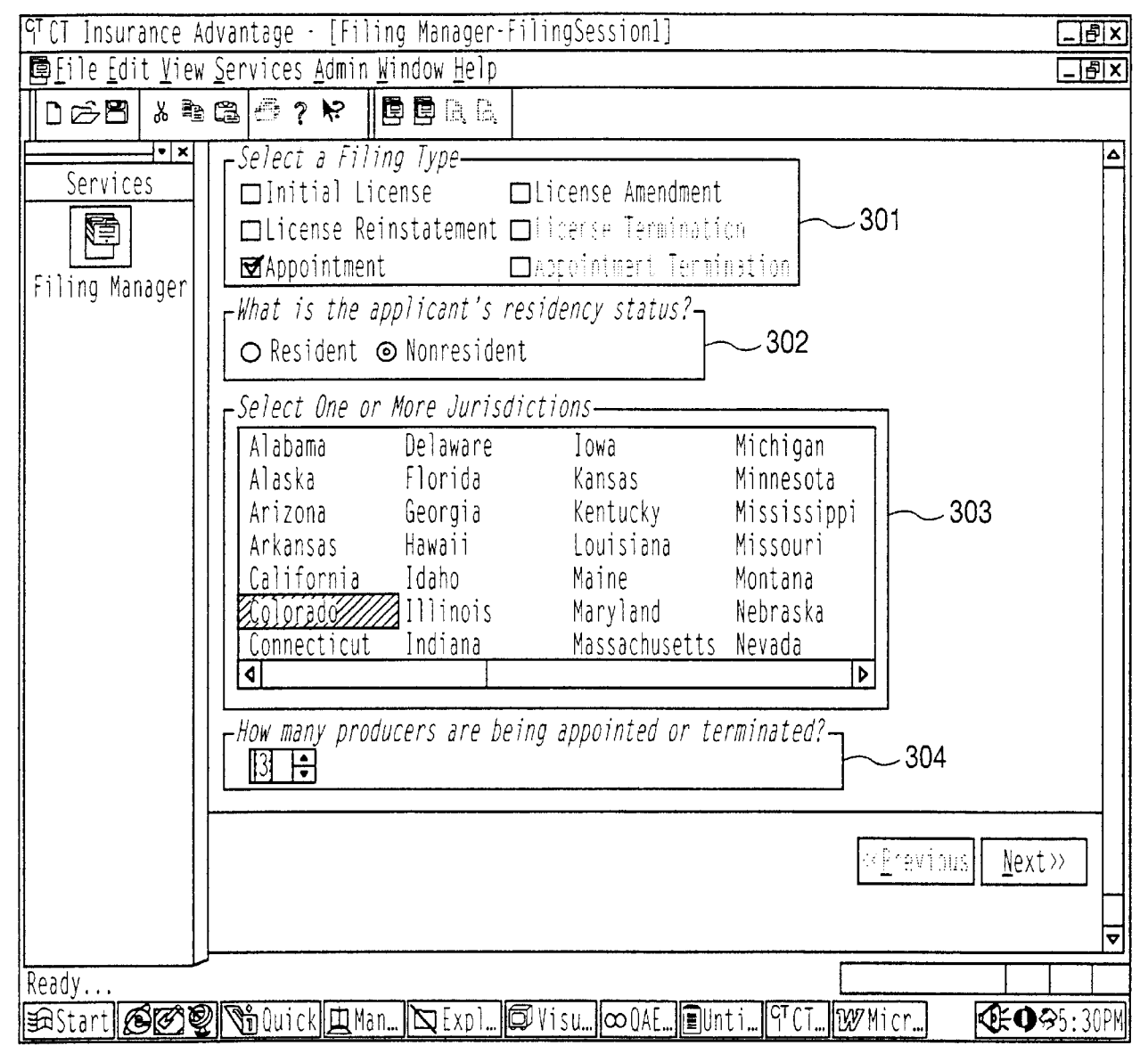

FIG. 3C shows the screen of FIG. 3A after a user has selected nonresident status in prompt 302 and a different jurisdiction that permits multiple producers (Colorado), thus enabling the "number of producers" prompt 304. Note that a different number of default producers can be set for each jurisdiction again using expert system rules to establish these assertions. The rule that enables number of producers prompt 304 for Colorado could be combined with the rule for Pennsylvania, such that prompt 304 is enabled if the selected jurisdiction is determined to be a member of a group that constitutes the "multi-producer" state group. Consequently, fifty different rules are not required to enable prompt 304.

Figure 3D:
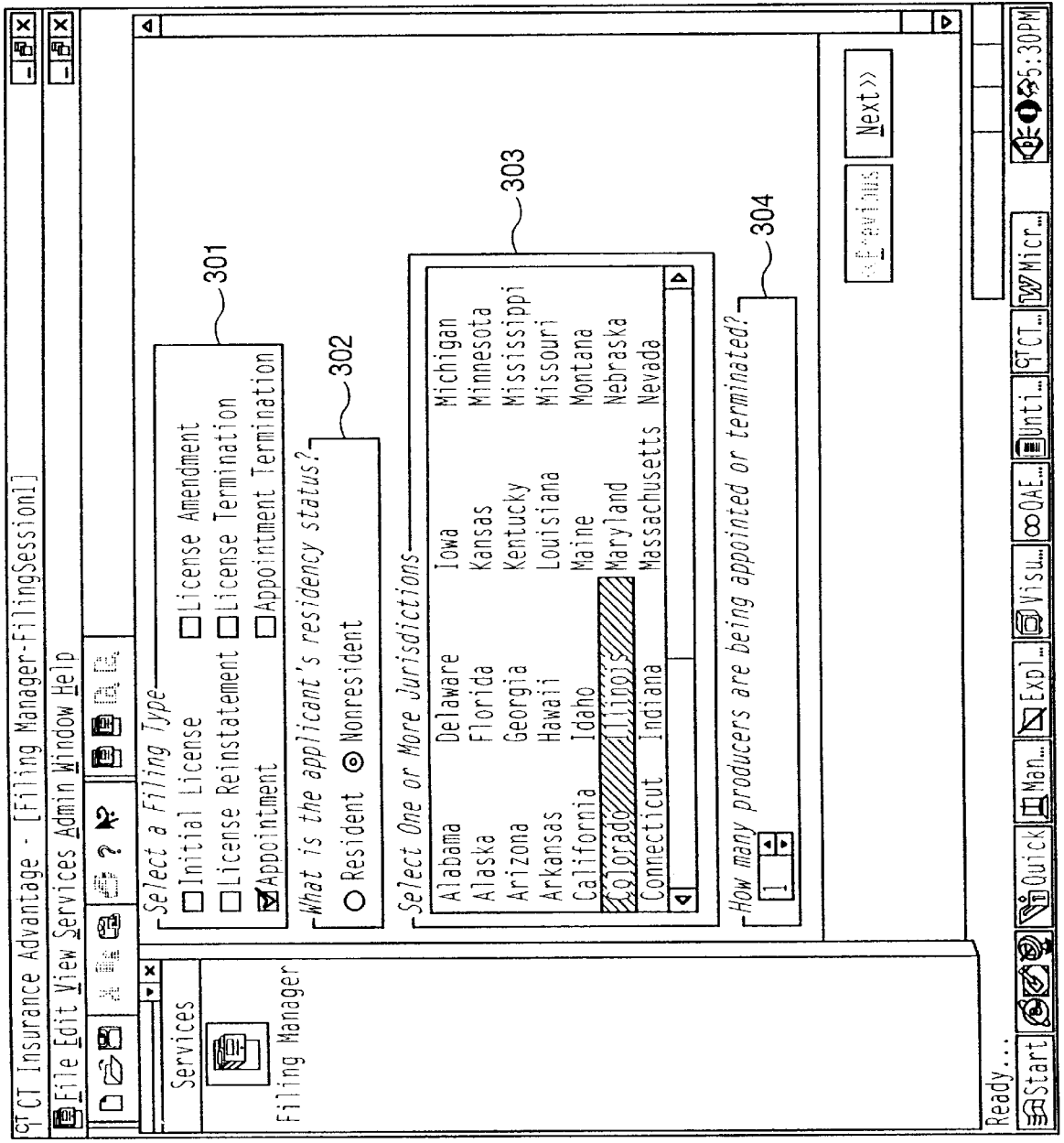
FIG. 3D shows the screen of FIG. 3A after a user has selected two jurisdictions, one of which permits multiple producers and the other which does not, thus disabling prompt 304.

FIG. 3D shows the screen of FIG. 3A after a user has selected two jurisdictions (Colorado and Illinois), one of which permits multiple producers (Colorado) and the other which does not (Illinois), thus disabling prompt 304. This illustrates a rule that prompt 304 cannot be enabled unless all of the selected jurisdictions are multiple producer states. In this situation, the number of producers is set to the default value of 1. If the user de-selects Illinois and selects a different second jurisdiction (e.g., Idaho), prompt 304 will again be enabled since Idaho is also a multi-producer state. This screen also illustrates a rule that multiple jurisdictions can only be selected if nonresident status is selected in prompt area 302. In other words, if a user selects "resident" in prompt 302, any attempts to select additional jurisdictions would be disabled by an expert system rule to that effect.

Figure 3F:
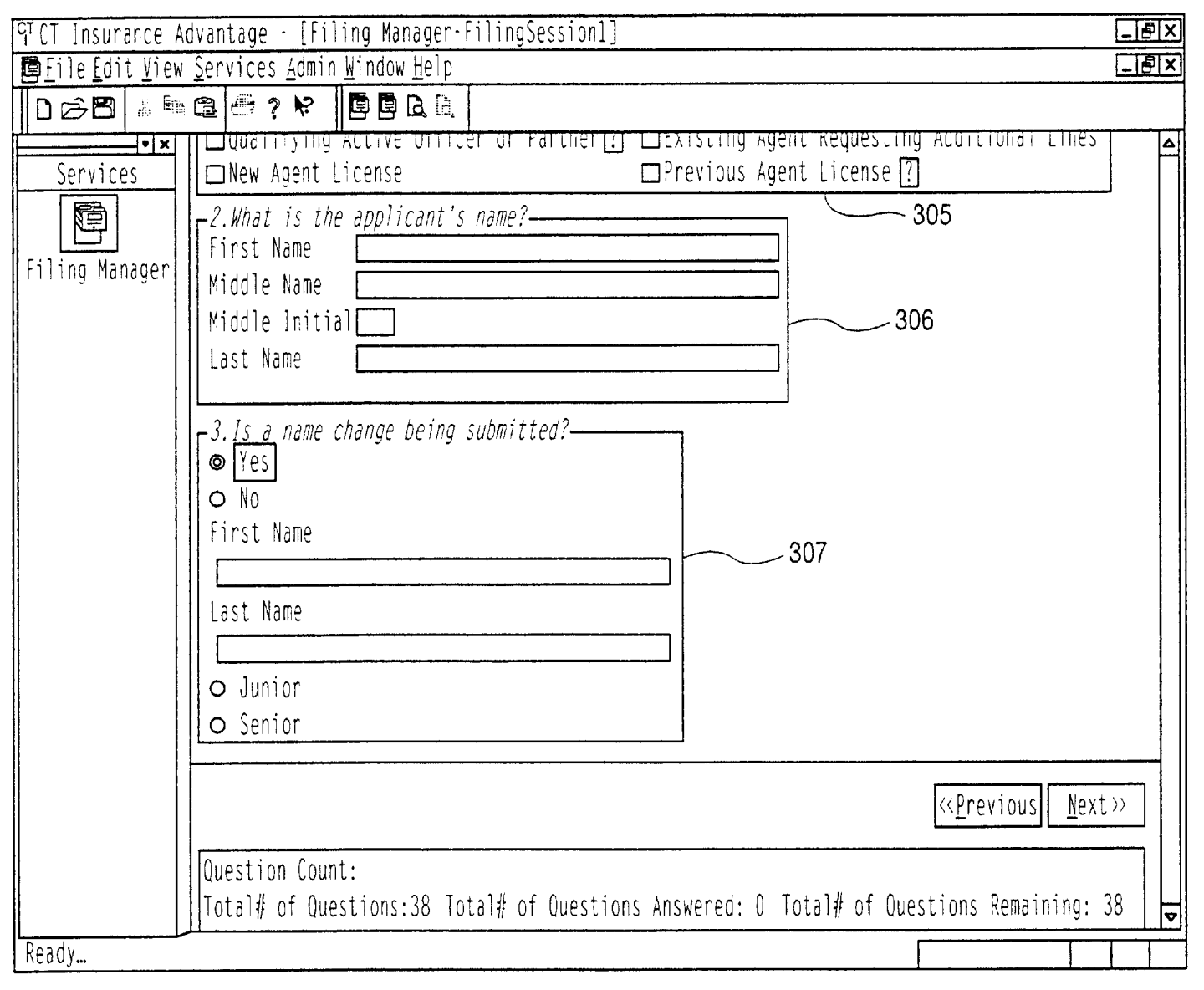

FIG. 3E shows a second-level GUI screen for an insurance/license appointment filing application that includes a partially disabled name change prompt 307. This screen illustrates a rule that disables most fields in a name change prompt area 307 unless the user selects "yes" within prompt area 307. When the user selects "yes" by clicking in the "yes" radio button in prompt area 307, a rule fires that asserts the necessary condition for displaying the remaining prompt fields in prompt area 307, as shown in FIG. 3F. As shown in FIG. 3E, a shadowed version of the prompt fields can be presented to the user in prompt area 307 to indicate that such fields will potentially be enabled upon the user specifying "yes." Prompt area 307 will be referred to as a "radio-text-group" because it includes a radio button (yes/no) that selectively activates the text groups within prompt area 307.

Note that instead of using an expert system rule to implement the selective enabling of the remaining text fields, this aspect of the display control could be hardcoded while retaining the flexibility to define the specific fields and the label associated with the prompt area ("Is a name change being submitted?") as form definition information in the database. In other words, the display could still be tailored to a specific application without hardcoding the application-specific data.

Prompt area 306 in FIG. 3E will be referred to as a "text group" control, which permits multiple prompt fields to be combined into a single framed area 306 for ease of use. The ordering of individual prompt fields within this group can be controlled through the use of priorities associated with each field, such that changing the priority of a particular field would change the order of its appearance on the screen.

FIG. 3F shows the screen of FIG. 3E after a user has selected "yes" in prompt area 307, thus fully enabling the name change prompt area 307. Another rule can be implemented to remove prompt area 307 if the user selects "no" in response to the prompt. (In an employment application, for example, selecting "married" in response to a marital status prompt can be used to fire a rule that generates a prompt for the spouse's name, social security number and date of birth, which would not be otherwise enabled).

Figure 3G:
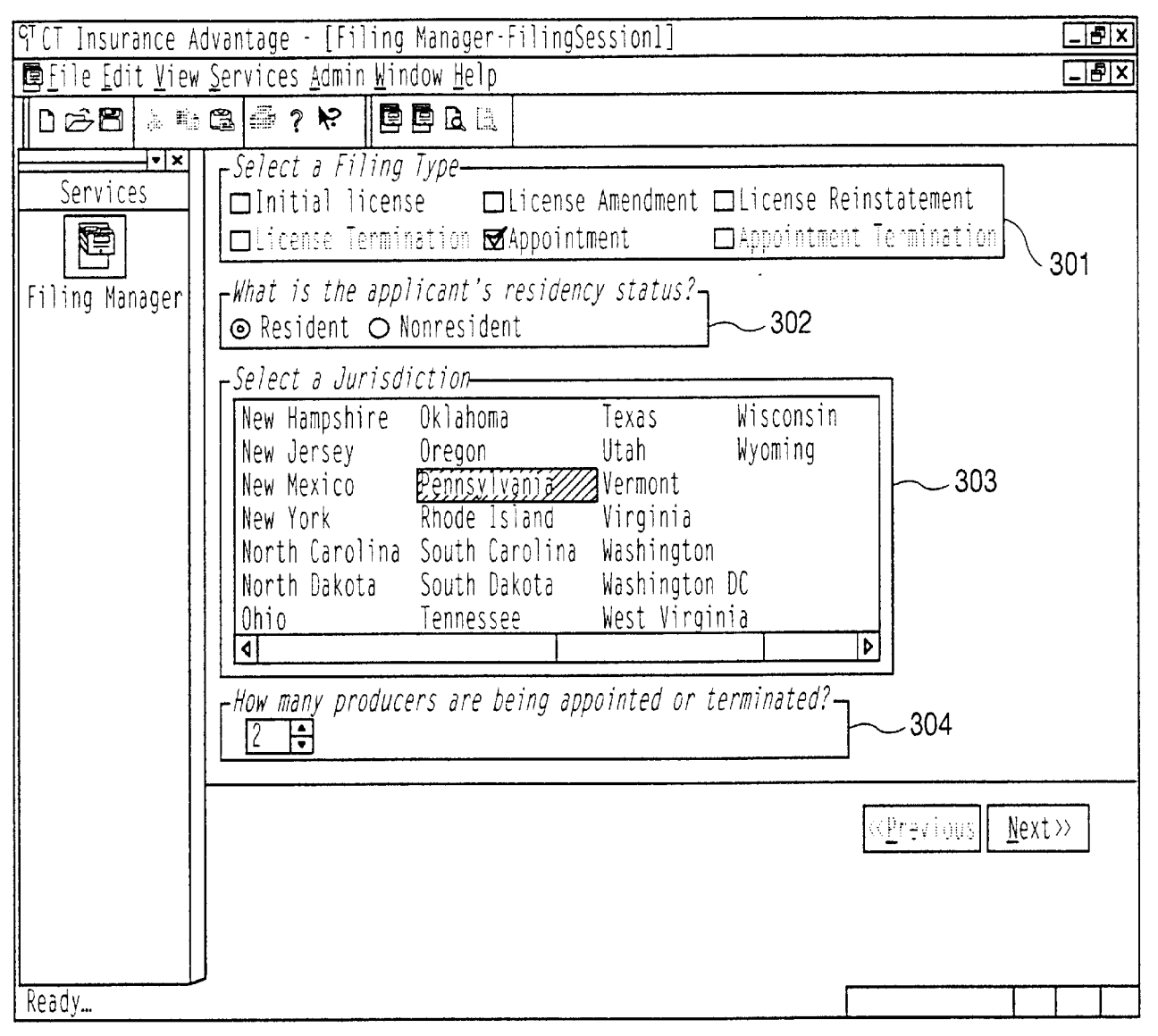
Figure 3J:
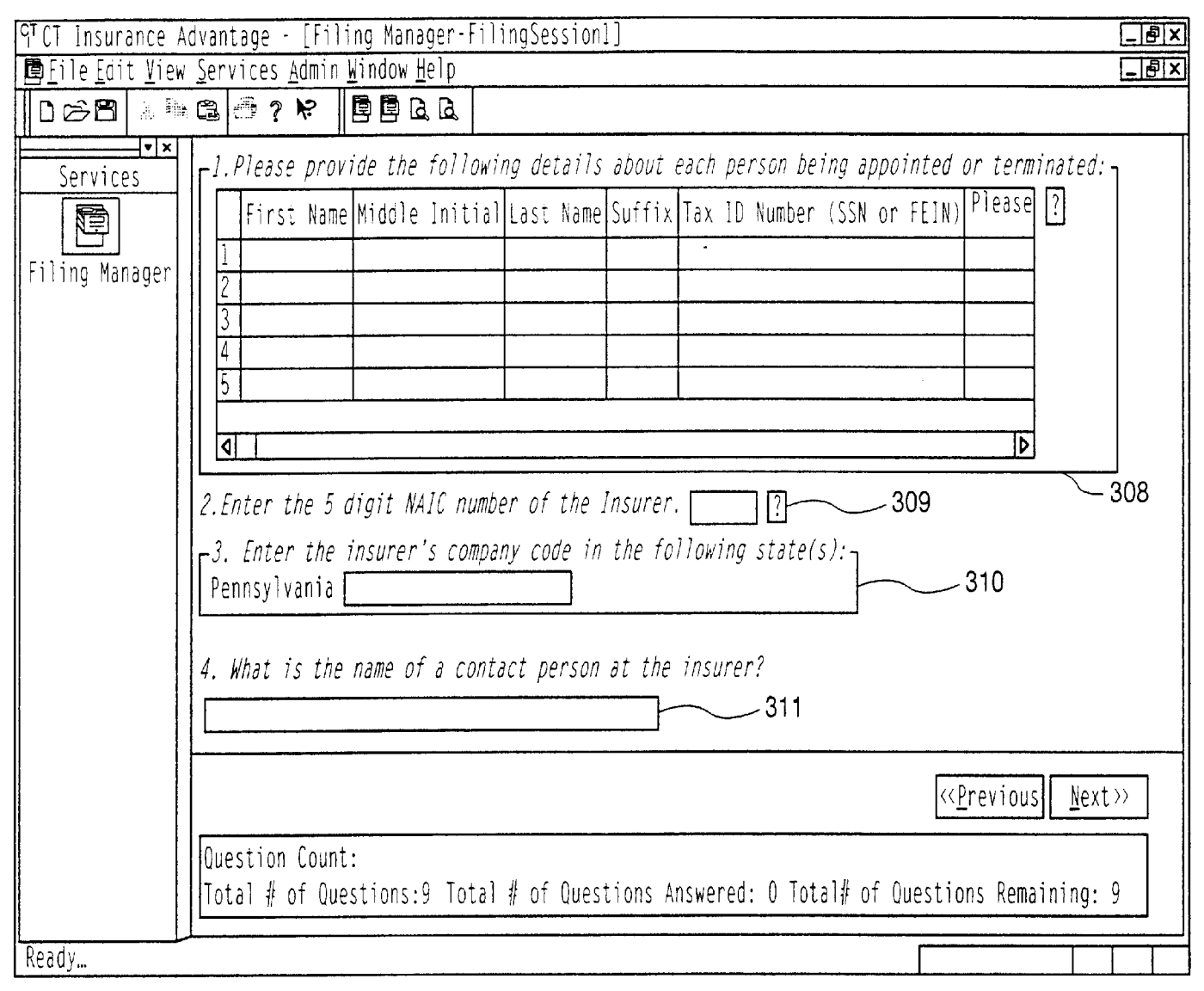

FIGS. 3G through 3J show how repeated or nested data fields can be dynamically generated in response to user selection of a number. FIG. 3G shows the screen of FIG. 3A after a user has selected Pennsylvania (a multi-producer state) and has specified two producers for that state in prompt field 304. Upon moving to the next screen, shown in FIG. 3H, it will be seen that two rows of data fields are provided in prompt area 308 for entering information pertinent to each producer (i.e., name, tax identification number, etc.). The number of rows generated on the screen corresponds to the number of producers selected in FIG. 3G. This display control mechanism will be referred to a "grid group." Additionally, prompts are also provided to solicit the information specifically needed for Pennsylvania, as shown in prompt areas 309, 310, and 311. This can be implemented using a rule that fires when Pennsylvania is selected, thus enabling these additional prompts.

FIG. 3I shows the screen of FIG. 3A after a user has specified 5 producers in prompt area 304. Upon moving to the next screen, shown in FIG. 3J, five row entries are generated in prompt area 308, corresponding to the number of producers selected in FIG. 3I. In this manner, the user interface is dynamically generated in response to selections made by the user, without the need to hardcode and test all preconditions and variations.

FIG. 3K shows a screen containing a group of radio groups 312. This display control mechanism includes a group consisting of smaller radio groups that can be displayed as one group. The group 312 shown in FIG. 3K consists of only one radio group (South Carolina, No/Yes), but it will be appreciated that multiple radio groups (e.g., North Carolina, No/Yes) can be grouped together into one display control construct 312. In accordance with various aspects of the invention, a user that answers one of the questions in group 312 may cause one or more choices in prompt areas 313 or 314 to be enabled or disabled depending on an expert system rule appropriate for that state. Again, these rules can be changed in the database without hardcoding specialized user interface software.

FIG. 3L shows a screen containing a "spin-grid-group" consisting of a spin control 315 and a grid 316 having a number of rows determined by the current spin value. Moreover, in the variant illustrated in FIG. 3L, one column of the grid includes a radio group 317 in each cell. The grid 316 has a number of rows that is dynamically determined by the current spin value. The user increments the spin control 315, causes the number of rows to increase (e.g., to 3 as shown). The column labeled "Did the applicant graduate?" defines cells including "radio buttons" allowing the user to specify whether he or she graduated. The radio buttons could be used to merely assert data in the knowledge base, or they could be used in conjunction with additional rules to prompt the user for further details, such as providing an explanation as to why the person failed to graduate from any school for which a "no" answer was provided.

This "spin-grid-group" display control mechanism can be implemented using either an expert system rule (i.e., every increment to the spin control causes a rule to fire, which regenerates the display to add another row) or it can be hardcoded while retaining the generic ability to use the control mechanism across different applications. In other words, the only "hardcoded" part of this mechanism would be the display software that reads the increment value and uses it to fetch a repeated number of rows defined for the particular application. The application-specific labels, column headings, number of columns, etc. could all be customized for the particular application by storing them in the database rather than hardcoding them in custom display software. For example, a rule could be specified as:

do_set_rows(qGrid, X):—is_answer(t5, X)

where qGrid is a prompt id for the grid control, and t5 is a prompt for the number of producers being appointed.

Reference will now be made to FIG. 4, which shows a method including steps for practicing various aspects of the present invention. What has previously been referred to as the "content creation" phase of the method corresponds in FIG. 4 to steps 401 through 406 (group 400a). What has previously been referred to as the "execution" phase of the method corresponds in FIG. 4 to steps 407 and 408 (group 400b). As described previously, steps in group 400a are typically executed once to set up a particular application (e.g., insurance filing system, employment processing system, etc.), while steps in group 400b are typically performed multiple times, once for each transaction that is to be processed (e.g., filing insurance forms for a group of states, or hiring an employee and selecting health benefits for that employee). Although the method of the present invention may be practiced in various ways, the steps shown in FIG. 4 will be described in more detail in order to provide a better understanding of the principles.

The process begins in step 401 by collecting all paper forms relating to a particular type of application (e.g., employment related forms, or FDA-related forms). Data from the paper forms is captured in step 401, such that the arrangement and content of information on existing paper forms can be stored in the system. In this respect, a scanner 110 (FIG. 1) in conjunction with image capture software 122 can be used to digitize and capture information from existing forms, such as employment forms and the like. A commercially available software package such as Adobe Exchange can be used for this purpose. The format of the original forms is preferably retained so that paper versions of forms that were captured can be generated later using data derived from the execution phase of the method. The output of image capture step can be one or more files such as PDF files, one for each form that will be generated at the end of the process.

In step 402, a work flow analysis is performed, typically by a person who understands how data in the system should be represented and modeled. For example, data from multiple forms relating to a single transaction (e.g., an employment application form and a health benefits form) are extracted and correlated to eliminate redundant information. Also in step 402, fields from each form can be assigned User Interface Field Tags (UIFIELD tags) which are unique identifier tags (e.g., "employee_name", "employee_marital_status" and the like), each corresponding to the display control widgets that will appear on the graphical user interface, such as check boxes, text boxes, list boxes, radio buttons, and spin controls. As the fields are analyzed, those fields that are a part of the actual form but will not appear on the user interface are assigned "hidden" field designations. This group of fields can be populated with values or computed from settings of other visible settings.

Redundant information is also eliminated in this step. For example, once it is recognized that the "employee_name" field is common to two different employment-related forms, the same unique identifier field (UIFIELD) is assigned to the different instances of employee name, even though they appear separately on two forms when generated on paper as an output. This correlation is typically done manually (i.e., the user must recognize and correlate this information), although it is also possible to automate this where form fields are recognizable as requesting the same information.

Step 402 may also include an analysis of dependencies among different forms to isolate information that occurs at a "transaction" level (i.e., information that only needs to be entered once for a particular transaction) and information that needs to be obtained at a "form" level (i.e., information that may vary or change depending on particular choices made within a transaction). As one example, an employee's name would only need to be supplied once (and thus would be prompted only once, at the beginning of the transaction), whereas other types of information (e.g., various medical procedures that are performed on a particular patient) would depend on the forms being selected to complete the transaction Nevertheless, the same question will not be asked multiple times. In the insurance filing application previously discussed, for example, the filing type, residency status and jurisdiction are examples of "transaction-level" data that needs to be specified only once during a transaction. Examples of "form-level" data that may need to be specified multiple times are details of each person being appointed or terminated, a 5-digit NAIC number of each insurer, the insurer's company code, and the name of a contact person at the insurer (see FIG. 3H).

Additionally, information that can be derived from other supplied information can be identified during this step (e.g., a person's age could be determined if the date of birth is known).

In steps 403 and 404, transaction-level prompts and form-level (or "question-level") prompts are defined. Prompts intended to appear on the graphical user interface are entered in a database 129 and assigned unique prompt identifiers (PROMPT_IDS) such as T1, T2, Q1, Q2, Q3, etc. An example of a prompt is a yes/no radio button prompt with a label indicating that selecting "yes" specifies that a name change is to be entered. (See, e.g., FIG. 3E, prompt area 307). While data associated with a response to this prompt may have a unique UIFIELD identifier, the prompt for soliciting that information may be reused among different forms, and can thus be assigned a separate PROMPT_ID. Moreover, not all data identified by UIFIELD identifiers will necessarily appear on a user interface screen.

Also in steps 403 and 404, prompts can be prioritized to indicate whether they are "transaction" level ("T" type prompts) or "form" level ("Q" type prompts). Transaction level prompts can be assigned a higher priority than question level prompts, and thus typically can be displayed at the beginning of the data entry process. Responses to transaction-level prompts may be needed in order to evaluate the forms and determine what remaining questions should be asked. Within transaction-level and form-level prompts, additional priority levels can be assigned to control the ordering of questions on the display. For example, a prompt for an employee name prompt can be assigned the highest priority level in order to force it to appear first on the display, followed in sequence by lower-priority prompts. In one embodiment, a user can be prevented from advancing to form-level screens until all required transaction-level prompts have been answered. This can be accomplished using an expert system rule that requires, as a precondition to displaying each question-level prompt, that all transaction-level prompts have been satisfied.

In step 405, user interface fields are defined and associated with prompts. Any other prompt-specific information, such as data formats (e.g., text, numeric, etc.) or range limits (e.g., permitted values) can also be specified in this step.

In step 406, expert system rules are defined and associated with prompts that will be displayed on the user interface. The rules may be specified using any of various well-known logic-based languages suitable for this purpose, such as PROLOG, Lisp, or others. It will be understood that the invention is not limited to the use of a specific language. However, many features of the present invention derive their simplicity and robustness from the use of such high-level language and its inference-based execution. Consequently, the invention will be explained using PROLOG as an example.

PROLOG is a fifth generation language and, unlike fourth generation languages, it can be used by people who have had no formal computer programing training. Programs that are lengthy and difficult to write in a 3GL such as C or C++ are shorter and easier to write using PROLOG. Writing in PROLOG involves making declarative statements instead of using procedural language. An inference engine "executes" rules, causing chain reactions among rules to occur. A natural language that allows a user to specify business rules in ordinary English could also be used.

The interactive display of prompts and navigation logic in one embodiment of the present invention can be specified in the database 129 using PROLOG predicates. PROLOG derives its power from a procedural interpretation of logic; it represents knowledge in terms of procedure definitions, and reasoning becomes a simple process of calling the right procedures. To see how this works, consider the following two pieces of information:

(a) For any X, if X is in Washington, then X is in the United States.

(b) Seattle is in Washington.

A collection of information such as this constitutes a knowledge base. Item (a) is a rule and item (b) is a fact PROLOG has its own way of representing this knowledge. The rule for item (a) is:

in_united_states(X:—in_washington(X).

The fact for item (b) is:

in_washington (seattle).

Here, in_united_states and in_washington are predicates. A predicate can take any number of arguments (like parameters). Supposing one wanted to know whether Seattle is in the United States, items (a) and (b) could be chained together to answer the question. The PROLOG inference engine could use the first rule to prove that if a city is in Washington, then it is in the United States. Then it would use the fact that Seattle is in Washington to prove that Seattle is in the United States.

According to one aspect of the present invention, predicates can be classified into two main categories: action and state observation. Action predicates specify what needs to be done on the graphical user interface, such as do_ask_question or do_display_strings. These predicates are used as the head of rules. The state observation predicates specify preconditions; i.e., when the action predicates need to be executed. The state predicates appear in the bodies of rules and are used by the inference engine to examine the facts at any particular instance based on user inputs and other facts. Some example rules are shown below.

action predicates: do_ask_question and do_display_strings.

state observation predicate: is_answer.

EXAMPLE 1 do_ask_question (residy).

Always ask the resident status of the producer unconditionally. Residy represents the Residency question (Are you a resident or non-resident?)

EXAMPLE 2 do_ask_question (sinjur):—is_answer (residy, 'Resident').

Ask the producer to select a single jurisdiction if the producer is a resident

EXAMPLE 3 do_ask_question (muljur):—is_answer (residy, 'Non-Resident').

Similarly, ask the producer to select one or more jurisdictions if the producer is a non-resident.

EXAMPLE 4 do_display_strings (lictyp, ['Solicitor', 'Broker', 'Agent And All Other']:—is_answer (sinjur, 'AZ'); is_answer (muljur, 'AZ').

Display the strings "Solicitor", "Broker" and "Agent And All Other" in the License Type prompt box only if the user selected AZ as a jurisdiction.

EXAMPLE 5 do_display_strings (catloa, ['Florida Exam Required', 'Florida No Exam Required', 'All Other']):—
(is_answer (sinjur, 'FL');
is_answer (muljur, 'FL')),
is_answer (protyp, 'Individual').

Display the strings "Florida Exam Required", "Florida No Exam Required" and "All Other" in the LOA Category list box if the producer is an individual and filing in Florida Note how the comma (,) and semicolon (;) operators are used to implement AND and OR operations.

Related prompts in a particular application should generally be shown together. For example, referring to the insurance filing application, a producer's first name, middle initial and last names belong to a logical category and should be displayed together in a single screen of the user interface. In order to handle this sort of layout need, prompts can be grouped into clusters. Alphabetic suffixes can be used for naming prompts m the same cluster. Accordingly, a prompt group to query for the name of the producer (first name, middle name, last name and so on) can be labeled as q2 (What is the producer's name) with sub prompts q2a (First Name), q2b (Middle Name), q2c (Last Name) and q2d (Suffix). These sub prompts belong to the same logical group and hence the same cluster. Consequently, they are displayed together. Further prompt identifiers can be associated with priority codes in order to allow ordering of prompts when displaying them, as outlined above.

In order to support the above scheme, the knowledge base rules in a particular application can be written using PROMPT_IDs, as follows:

do_ask_question (t1a):—is_answer (t1b, no),
    is_answer (t1c, no),
    is_answer (t1d, no).

The above means ask for "initial License" filing type (which has PROMPT_ID t1a) only if the answers to the filing types "License Amendment" (with PROMPT_ID t1b), "License Reinstatement" (with PROMPT_ID t1c) and "License Termination" (with PROMPT_ID t1d) are no. This causes the "Initial License" checkbox to be enabled only if none of the "License Amendment", "License Reinstatement" and "License Termination" boxes have been checked. Similarly, the rule do_display_strings(q237, ['Agent', 'Travel Baggage', 'Local', 'Special', 'General', 'Associated Person', 'Life, Health & Accident', 'All Other']):—
    is_answer (t3, 'PA');
    is_answer (t3, 'RI');
    is_answer (t4, 'PA');
    is_answer (t4, 'RI').

instructs the user interface to display the strings 'Agent', 'Travel Baggage', 'Local', 'Special', 'General', and 'Associated Person' to be displayed in the License Type prompt area for Applicant list box if PA and RI are selected from the list of states.

In addition to user specifications, the system can generate implicit rules and facts. For example, to clear answers for questions, the rules could be:

% to clear all answers for a prompt do_clear_answer(X):—retractall(is_answer(X,_)).

% to clear specific answers for a prompt do_clear_answer (X,Y):—retactall(is_answer(X,Y)).

Certain special action predicates can be defined, including:

do_populate_uifield_prompt(fieldid, promptid):—
    preconditions.
do_populate_uifield_variable(fieldid, X):—
    preconditions and computational formulas.

These rules can be activated at runtime based on user responses to questions. The rule:

do_populate_uifield_prompt will cause the contents of the UI field used for promptid to be copied to the User Interface/Forms field with fieldid if preconditions are satisfied. Similarly, the rule:

do_populate_uifield_variable will cause computations to be performed if preconditions are satisfied, compute the variable X and set the value of uifieldid to the computed value.

One might wonder why field identifiers should be used instead of prompt ID's as the first arguments of these predicates. In some forms, the same field appears as a part of distinct groups and needs to be populated for one group of multiple groups based on answers to other questions. An example form is "Application for change of name/change of address" in the state of Pennsylvania. Here, there are different questions such as "Check here if change of address" (q1), "Check here if change of name" (q2), and different groups of questions, "Section 1: Change of Address Request" and "Section 2: Change of Name Request". There is a Social Security Number (SSN) field which appears in both the sections. The different possibilities are:

The user checks q1 only, in which case the SSN field is set in section 1.

The user checks q2 only, in which case the SSN field is set in section 2.

The user checks q1 and q2, in which case the SSN field is set in both the sections.

In order to handle such situations, every occurrence of the SSN field in the form is preferably fielded with a unique fonn field id. In the example above, two SSN field id's are created, SSN1 and SSN2. Corresponding to these, matching UI field id's (SSN1 and SSN2) are created in the knowledge base. However, these fields are form specific and do not pertain to the actual user interface. In order to ask the relevant question in the user interface, a logical prompt is created, such as q3 with the text "What is your Social Security Number?" This question does have a displayable UI field which is answered by the user during an execution session. In order to set the actual form fields dynamically there can be rules such as:

do_populate_uifield_pompt(SSN1, q3):—is_answer(q1, yes).

do_populate_uifield_prompt(SSN2, q3):—is_answer (q2,yes).

So, the prompts can actually be a part of the user interface. They are fetched, sorted and displayed in order to ask the minimum set of questions required for generating the forms. On the other hand, the fields are form specific. Most of them are associated with prompts and appear as a part of a session. Some are just populated with values and computed results; they do not appear as a part of the user interface, but values are used in the printed form.

Fields can also be set with computed values. Suppose that, for a particular form, a field for the fees FEE_105 needs to be automatically populated with a computed value. Suppose this is 20 times what the user entered in the field for a particular line of authority (prompt id q34). This can be expressed with a rule such as:

do_populate_uifield_variable(FEE_105, Y):—is_answer(q34, X), Y is X*20.

Similarly, do_populate_uifield_number and do_populate_uifield_constant are predicates to set a field with numeric and string values.

In accordance with the foregoing general explanation and examples, in step 406 the expert system rules are defined for a particular application. The nature of the rules will, of course, vary greatly among different applications.

It is generally contemplated that each prompt to be displayed on the user interface will have one or more associated rules. (Other rules may not be associated with a particular prompt, but may exist as stand-alone rules). For example, if an employee is not a U.S. citizen, he should not be asked for a social security number. This can be accomplished by creating a rule that disables the social security number prompt in response to checking a "non-U.S. citizen" box on the display. As another example, if an employee checks "married" for marital status, then the prompt for a spouse's name and date of birth would be enabled. These rules can be specified by human resource administrators, lawyers, and other non-programmers, without knowledge of how the underlying system is programmed.

It is also generally contemplated that every user action on the user interface will be registered as state information in the knowledge base, and the next move made by the user interface will be based on that state. For example, if a user selects "married" as his marital status, that selection is translated into an assertion in the knowledge base that may cause one or more additional rules to fire, thus changing the prompts that will be displayed. This dynamic nature of the user interface can be achieved without complicated programming.

Returning to FIG. 4, assuming that the fonns have been defined and expert system rules created to dictate the behavior of the user interface, a transaction is executed in step 407 by prompting the user in accordance with data previously entered by the user and rules executed in inference engine 125 (FIG. 1). This step is of course application-specific. For example, an employment hiring transaction could involve the step of retrieving a transaction-level form from the database, displaying the form, and capturing user responses to the prompts. In response to the user's entry of in the fields, the expert system rules are fired, causing prompts to be added or removed from the display. The entire flow of the user interface can be specified and changed by changing the rules in the knowledge base.

Figure 5:
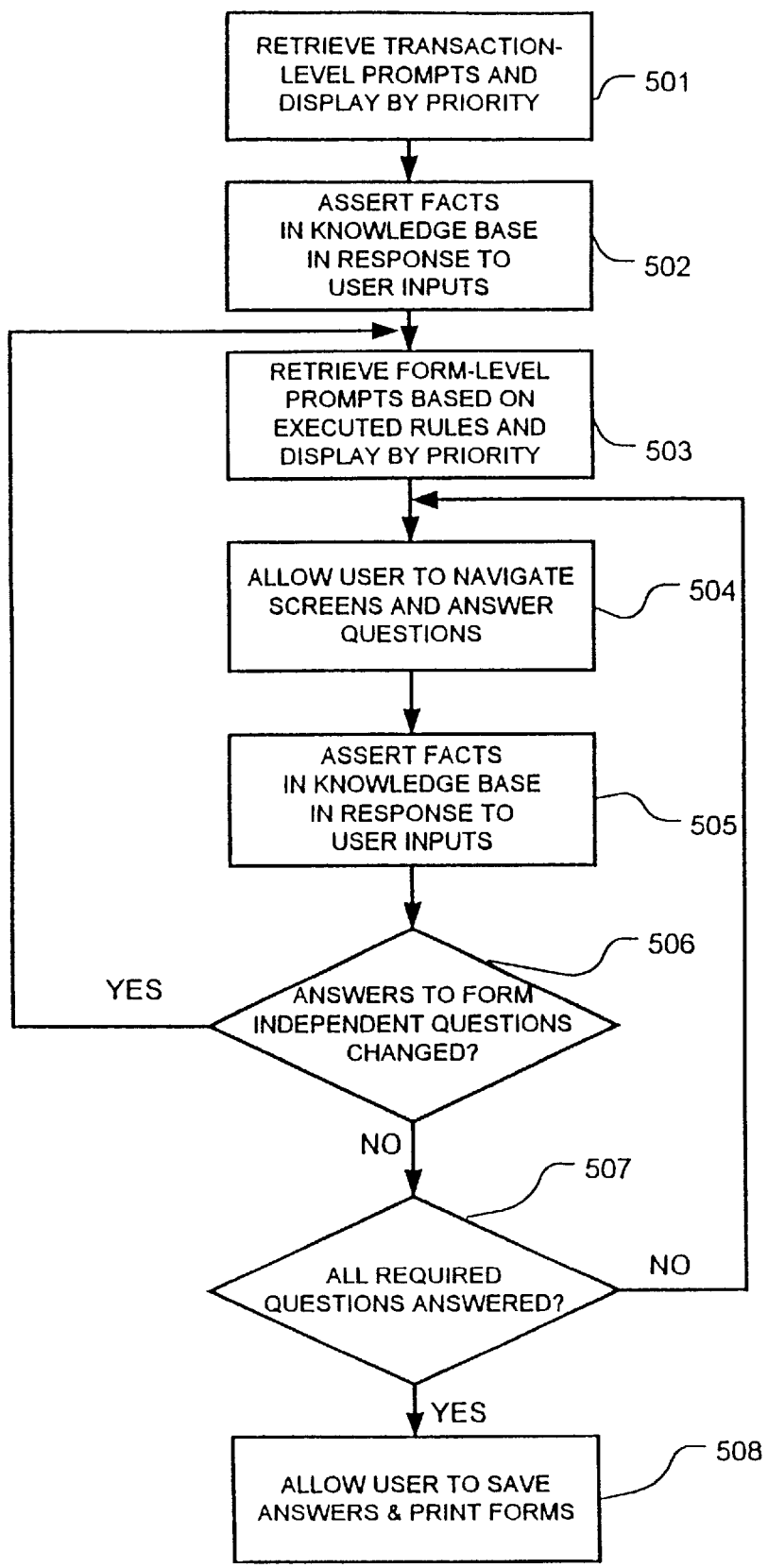
FIG. 5 is a flow chart for a display generator that uses expert system rules to dynamically generate a user interface, including steps of retrieving transaction-level prompts and displaying them according to a preassigned priority level, reading user inputs and asserting facts in the knowledge base based on the user inputs, executing expert system rules, and displaying a different user interface screen based on the executed expert system rules.

Turning briefly to FIG. 5, a set of steps is shown that can be executed by display generator 123 (FIG. 1) or dynamic HTML generator 233 (FIG. 2) in order to dynamically generate a user interface based on the expert system rules. In step 501, all transaction-level prompts are retrieved from the database and displayed in order of priority. For example, an employee's name, address, and social security number could constitute a transaction-level form for an employee action such as hiring a new employee. In response to entry of information on the form, predicates in the knowledge base (facts) are asserted in step 502. (It is assumed that the inference engine run in the background, and any newly asserted facts can cause a chain-reaction among rules in the knowledge base). Thereafter, in step 503, form-level prompts are retrieved, based on rules that have been executed, and are displayed in priority order. If an employee has specified "married" for marital status, for example, a rule may fire indicating that a "spouse information" prompt should be displayed.

In step 504, the user is permitted to navigate through screens of forms in order to answer questions, using "next/previous" buttons if necessary (see FIG. 3H, for example). In step 505, facts are asserted in the knowledge base in response to the user's inputs during the screen navigation. (As before, various rules can fire in response to the assertions, thus changing the appearance of the screens during this navigation). In step 506, if the answers to any form independent questions were changed, then step 503 is executed based on rules fired in the database in response to the answers entered by the user. Otherwise, in step 507 a test is made to determine whether all mandatory questions were answered. If not, processing returns to step 504.

When all required questions have been answered, the user can save his or her answers and print output forms populated with information entered by the user (and, if relevant, information derived from other sources). For example, based on answers entered by the user during the session, a set of output forms (e.g., employment application, health benefits form, income tax withholding form) can be generated in accordance with the form definition information stored in database 229. Consequently, although the user may have only entered his name once at the transaction level, all forms containing that name would be populated with the same information and printed on different sheets of paper. Moreover, where the user specified "unmarried" in response to a marital status prompt, any fields on the output forms relating to a spouse would be either left blank or indicated as "not applicable", even though the user was never prompted for that information. Finally, data that could be derived from other sources (e.g., a person's age derived from a birth date) could also be automatically populated onto output forms in the appropriate field and according to the desired format Note that the format (i.e., arrangement, style, size, etc.) of the output forms can be made to match those of the input forms because of scanner 210 and image capture package 222. Alternatively, these forms can be manually formatted and a template stored in database 229.

Retuning to FIG. 4, one or more forms can be printed or stored for future use or electronic filing in step 408. This step can be carried out using any of various commercial packages such as Adobe Acrobat. The forms may be filed electronically using appropriate filing packages (e.g., Internal Revenue Service), or over the Internet for example.

The data needed for the various steps shown in FIG. 4 can be stored in a database 129 such as Microsoft Access or even a spreadsheet such as Microsoft Excel. Although the particular data schema will of course be application-dependent, certain data storage features may be common across different applications.

As one example, a first table can be used to store a complete list of transactions (e.g., hire an employee, fire an employee, etc.), each having a transaction code and description A second table can be used to store transaction formsets, which maps each transaction type to one or more jurisdictions (e.g., hiring an employee in New York, hiring an employee in Washington DC.) and, for each such combination, providing a form identifier specifying what forms are required for that transaction/jurisdiction combination A third table can be used to describe each form. A fourth table can be used to map formsets and forms to particular jurisdictions. A fifth table can be used to store form attributes (e.g., what each form looks like when printed). A sixth table can associate each form and jurisdiction pair to a prompt ID and expert system rule. This takes advantage of one of the inventive features—i.e., associating logic-based rules with prompts. A seventh table can be used to associate "help" strings with each combination form ID/jurisdiction. An eighth table can be used to associate prompt IDS with UI fields, and also to associate priority levels with prompts (i.e., transaction level prompt or form level prompt, and also priorities within each level). A ninth table can be used to map UI fields to labels, control types (radio knob, radio button, check box, spin control, radio text group, grid group, etc.) and format (i.e., alphabetic, numeric, etc.). Other tables can be used to store formatting information for output forms, indicating what fields should appear on each printed form.

Assuming the information described above is stored in separate tables, it is of course possible to convert the data into third normal form and store it in a relational database for easier access and optimization. Additionally, although the expert system rules can be stored in the database, it may be preferable to extract the rules, combine them with other general rules that are application-independent (e.g., for setting up the display and initializing data values), and compile them into a binary file that can be executed by a PROLOG inference engine.

As a general design principle, it is highly desirable that no question be repeated to the user, even if it appears across multiple forms. In other words, redundant data should be eliminated, a piece of information should only be requested once from a user for a particular transaction, regardless of how many forms will be generated incorporating that piece of information. Moreover, it is highly desirable that user prompts be prioritized such that they are asked in an optimal sequence. Transaction-level prompts should be displayed first (and, within that level, prioritized) and form-level prompts displayed next (again prioritized within that level). Prompts that, when answered, would eliminate the need for further prompts in a particular area should also be given priority. For example, prompting for marital status would eliminate the need to prompt for spousal information. Finally, all compulsory questions should be asked and answered before a session is successfully completed.

The applications for which the principles of the present invention can be practiced are numerous. For example, doctors who must process large numbers of insurance forms for their patients can simplify and automate that processing using the expert system techniques described herein. Similarly, state and federal agencies that process enormous quantities of paperwork including many different forms each containing redundant information (e.g., name, address, social security number) and irrelevant (e.g., spouse's name, etc.) information can populate such forms using the expert system rules and techniques outlined herein. In both cases, the display rules and formatting variations can be changed without the need for customized software tailored to the particular application. The inventive principles can also be applied to tax preparation, and family legal advice type applications. Other applications and variations for the invention are of course possible.

Reference numerals in the appended method claims identifying steps are for convenience only and are not intended to imply a necessary ordering of the steps. It is apparent that the method steps of the invention may be practiced in a different ordered sequence from that illustrated without departing from the scope of the invention. It is, therefore, to be understood that within the scope of the appended claims the invention may be practiced otherwise than as specifically described.

What is claimed is:

1. A computer-implemented method of dynamically prompting a user for information, comprising the steps of:
   (1) displaying on a computer display device a form comprising a first plurality of prompts;
   (2) receiving a response corresponding to one of the first plurality of prompts from the input device;
   (3) converting the response received in step (2) into a factual assertion in a rule-driven knowledge base comprising rules written in a declarative language;
   (4) executing one or more rules in the rule-driven knowledge base to test for a condition satisfied by a previously asserted fact, and
   (5) in response to the condition being satisfied in step (4), changing the appearance of the form to display a new prompt or enable a disabled prompt, wherein the newly displayed or enabled prompt would not otherwise have been displayed or enabled absent satisfaction of the condition.

2. The method of claim 1, further comprising the step of, in response to the condition being satisfied in step (4), changing the appearance of the form to remove or disable a previously enabled prompt, wherein the removed or disabled prompt would not otherwise have been removed or disabled absent satisfaction of the condition.

3. The method of claim 1, further comprising the step of, prior to step (1), retrieving from a database display control information used to control the appearance of the form on the computer display.

4. The method of claim 3, wherein the display control information comprises priorities associated with each of the first plurality of prompts, and wherein step (1) comprises the step of using the priorities to determine a display order of the first plurality of prompts.

5. The method of claim 1, wherein step (1) comprises the step of displaying a radio text group prompt that forces the user to select from among a predetermined set of choices before a text prompt is enabled.

6. The method of claim 1, wherein step (1) comprises the step of displaying a spin grid group prompt that, in response to incrementing a spin value by the user, displays additional rows of a grid for which the user can enter data.

7. The method of claim 6, wherein each row of the grid contains at least one element comprising a group of radio buttons for which the user can select one or more predetermined choices.

8. The method of claim 1, wherein step (1) comprises the step of displaying a group prompt comprising at least one sub-group of radio buttons, each button corresponding to a possible choice that can be selected by the user.

9. The method of claim 1, further comprising the step of:
   (6) populating a printable output form with responses received from the input device; and
   (7) printing the printable output form.

10. The method of claim 1, wherein step (4) comprises the step of executing rules written in the PROLOG language in an inference engine, wherein choices made by the user are mapped to assertions in the rule-driven knowledge base, and wherein inferences drawn from the assertions are used to change the prompts that are displayed to the user.

11. The method of claim 1, wherein step (4) comprises the step of executing rules written in a natural language, wherein choices made by the user are mapped to assertions in the rule-driven knowledge base, and wherein inferences drawn from the assertions are used to change the prompts that are displayed to the user.

12. A system for implementing a graphical user interface, comprising:
   a computer display device including an input device; and
   a computer coupled to the computer display device;
   wherein the computer includes a graphical user interface program component that dynamically generates screen configurations based on execution of logic-based rules in a knowledge base, wherein one or more conditions in the logic-based rules are satisfied by answers entered by a user in response to prompts on the computer display device.

13. The system of claim 12, wherein the computer includes an inference engine that executes the logic-based rules to assert acts and draw conclusions based on the answers entered by the user.

14. The system of claim 12, wherein the screen configurations include a plurality of grouped prompts each of which is associated with at least one of the logic-based rules in the knowledge base.

15. The system of claim 14, wherein the plurality of grouped prompts includes a adio text group that forces the user to select from among a predetemined set of choices before a text prompt is enabled.

16. The system of claim 14, wherein the plurality of grouped prompts includes a spin grid group prompt that, in response to incrementing a spin value by the user, displays additional rows of a grid for which the user can enter data.

17. The system of claim 16, wherein each row of the grid contains at least one element comprising a group of radio buttons for which the user can select one or more predetermined choices.

18. The system of claim 14, wherein the plurality of grouped prompts includes a group prompt comprising at least one sub-group of radio buttons, each button corresponding to a possible choice that can be selected by the user.

19. The system of claim 12, wherein the computer further comprises:
- a scanner and associated image capture software that captures information from existing forms and stores them in a database; and
- means for printing output forms populated with information input by the user and formatted according to the information captured from the existing forms.

20. A distributed processing system, comprising:
- a server computer comprising a dynamic HTML generator component that generates HTML in response to inferences drawn by rules in a knowledge base, wherein the rules are written in a declarative language and define prompts that are to be displayed to a user on a client computer; and
- a plurality of client computers each coupled to the server computer over a network, each client computer comprising a web browser that communicates with the dynamic HTML generator to display one or more prompts in response to the HTML dynamically generated by the server computer;
- wherein the prompts that are to be displayed to the user dynamically change in response to answers provided by the users on the client computers.

21. A method of processing forms using a computer, comprising the steps of:

(1) capturing information in the computer from a plurality of preexisting paper forms and identifying redundant and overlapping fields across the plurality of preexisting paper forms;

(2) defining a plurality of transaction-level prompts that prompt a user for information without prompting for redundant information;

(3) defining a plurality of form-level prompts that prompt the user for additional information needed to populate fields on the preexisting paper forms;

(4) defining expert system rules and associating them with the plurality of transaction-level and form-level prompts, wherein the expert system rules define those prompts that will appear to the user on the basis of previous responses; and (5) executing in the computer the expert system rules such that certain prompts are presented to the user on the basis of previous responses.

22. The method of claim 21, further comprising the step of:

(6) populating a plurality of printable forms on the basis of responses received from the user; and (7) printing the plurality of printable forms.

* * * * *

UNITED STATES PATENT AND TRADEMARK OFFICE
CERTIFICATE OF CORRECTION

PATENT NO. : 6,314,415 B1
DATED : November 6, 2001
INVENTOR(S) : Krishna Mukherjee It is certified that error appears in the above-identified patent and that said Letters Patent is hereby corrected as shown below:

Column 1,
Line 37, "of" has been deleted,

Column 5,
Line 62, "alternatively" has been replaced with -- Alternatively --,
Line 65, "Intemet" has been replaced with -- Internet --, Column 12,
Line 25, a -- . -- has been inserted after the word "action", Column 13,
Line 46, "states(X:" has been replaced with -- states(X): --, Column 14,
Line 45, a -- . -- has been inserted after the word "Florida",
Line 55, "m" has been replaced with the word -- in --, Column 15,
Line 34, "retactall" has been replaced with the word -- retractall --, Column 16,
Line 7, "fonn" has been replaced with the word -- form --, Column 17,
Line 4, "fonns" has been replaced with the word -- forms --,
Line 28, "run" has been replaced with the word -- runs --,
Line 46, "executed" has been replaced with the word -- re-executed --, Column 18,
Line 8, "Returning" has been replaced with -- Returning --,
Line 23, a -- . -- has been inserted before the word "A"
Line 29, a -- . -- has been inserted after the word "nation", Column 19,
Line 1, "priontized" has been replaced with -- prioritized --,
Line 5, "ehiminate" has been replaced with -- eliminate --.

UNITED STATES PATENT AND TRADEMARK OFFICE
CERTIFICATE OF CORRECTION

PATENT NO. : 6,314,415 B1
DATED : November 6, 2001
INVENTOR(S) : Krishna Mukherjee It is certified that error appears in the above-identified patent and that said Letters Patent is hereby corrected as shown below:

Column 20,
Line 45, "acts" has been replaced with -- facts --,
Line 52, "adio" has been replaced with -- radio --.

Signed and Sealed this

Twenty-fifth Day of June, 2002

Attest:

Attesting Officer

JAMES E. ROGAN
Director of the United States Patent and Trademark Office